United States Patent
Bickham et al.

(10) Patent No.: US 9,481,599 B2
(45) Date of Patent: Nov. 1, 2016

(54) METHOD OF MAKING A MULTIMODE OPTICAL FIBER

(75) Inventors: Scott Robertson Bickham, Corning, NY (US); Oleksandr Kogan, Wilmington, NC (US); Ming-Jun Li, Horseheads, NY (US); Snigdharaj Kumar Mishra, Wilmington, NC (US); Pushkar Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 144 days.

(21) Appl. No.: 13/331,610

(22) Filed: Dec. 20, 2011

(65) Prior Publication Data
US 2013/0029038 A1 Jan. 31, 2013

Related U.S. Application Data

(60) Provisional application No. 61/425,477, filed on Dec. 21, 2010.

(51) Int. Cl.
*C03B 37/014* (2006.01)
*G02B 6/028* (2006.01)
*C03B 37/025* (2006.01)

(52) U.S. Cl.
CPC ..... *C03B 37/01413* (2013.01); *C03B 37/0253* (2013.01); *G02B 6/0288* (2013.01); *C03B 2201/12* (2013.01); *C03B 2201/28* (2013.01); *C03B 2201/31* (2013.01); *C03B 2201/32* (2013.01); *C03B 2203/23* (2013.01); *C03B 2203/26* (2013.01); *C03B 2205/40* (2013.01); *Y02P 40/57* (2015.11)

(58) Field of Classification Search
CPC ............. C03B 2205/40; C03B 37/0253
See application file for complete search history.

(56) References Cited

U.S. PATENT DOCUMENTS

| | | | | |
|---|---|---|---|---|
| 3,933,454 A | * | 1/1976 | DeLuca | 65/422 |
| 4,149,772 A | | 4/1979 | Iyengar et al. | 350/96.33 |
| 4,176,911 A | | 12/1979 | Marcatili et al. | 350/96.31 |
| 4,184,744 A | | 1/1980 | Onoda et al. | 350/96.33 |
| 4,203,743 A | | 5/1980 | Suganuma et al. | 65/3 |
| 4,229,070 A | | 10/1980 | Olshansky et al. | 350/96.31 |

(Continued)

FOREIGN PATENT DOCUMENTS

| | | |
|---|---|---|
| EP | 1 043 609 | 10/2000 |
| EP | 1 083 446 | 3/2001 |

(Continued)

OTHER PUBLICATIONS

T.L. Wu, et al., "A Novel Ultraflattened Dispersion Photonic Crystal Fiber," *IEEE Photonics Technology Letters*, vol. 17, No. 1, Jan. 2005, p. 67-69.

(Continued)

*Primary Examiner* — John Hoffmann
(74) *Attorney, Agent, or Firm* — Kevin M. Able

(57) ABSTRACT

A method of making a multimode optical fiber is disclosed. In one embodiment the method includes calculating a core radius that maximizes the bandwidth of the multimode optical fiber wherein the effect of draw tension is accounted for. The embodiments herein illustrate how core radius can be tuned so the time delay of the outermost guided mode group is reduced. The resultant core radius may be targeted for a value off-nominal from what would be expected for a particular commercial optical fiber type.

14 Claims, 10 Drawing Sheets

(56) References Cited

U.S. PATENT DOCUMENTS

| | | | | |
|---|---|---|---|---|
| 4,281,893 A | 8/1981 | Yamada et al. | ............ | 350/96.31 |
| 4,286,979 A | 9/1981 | Buckler et al. | | |
| 4,339,174 A | 7/1982 | Levia | ............ | 350/96.31 |
| 4,715,695 A | 12/1987 | Nishimura et al. | ............ | 350/96.31 |
| 5,123,076 A | 6/1992 | Nishimoto et al. | ............ | 385/124 |
| 5,191,206 A | 3/1993 | Boiarski et al. | ............ | 250/227.14 |
| 5,802,236 A | 9/1998 | DiGiovanni et al. | ............ | 385/127 |
| 6,614,974 B2 | 9/2003 | Elrefaie et al. | ............ | 385/125 |
| 6,636,675 B2 | 10/2003 | Soufiane | ............ | 385/123 |
| 6,671,442 B2 | 12/2003 | Wang et al. | ............ | 385/125 |
| 6,687,445 B2 | 2/2004 | Carter et al. | ............ | 385/127 |
| 6,766,088 B2 | 7/2004 | Hasegawa | ............ | 385/123 |
| 6,773,825 B2 | 8/2004 | Pickrell et al. | ............ | 428/566 |
| 6,795,635 B1 | 9/2004 | Fajardo et al. | ............ | 385/140 |
| 6,904,215 B2 | 6/2005 | Christoff et al. | ............ | 385/124 |
| 7,006,751 B2 | 2/2006 | Provost et al. | ............ | 385/141 |
| 7,039,284 B2 | 5/2006 | Nakahara | ............ | 385/125 |
| 7,043,128 B2 | 5/2006 | CiGiovanni et al. | ............ | 385/126 |
| 7,054,513 B2 | 5/2006 | Herz et al. | ............ | 385/12 |
| 7,072,552 B2 | 7/2006 | Manyam et al. | ............ | 385/125 |
| 7,142,758 B1 | 11/2006 | Herz et al. | ............ | 385/125 |
| 7,174,078 B2 | 2/2007 | Libori et al. | ............ | 385/125 |
| 7,787,731 B2 | 8/2010 | Bookbinder et al. | ............ | 385/124 |
| 7,865,050 B1 | 1/2011 | Sun | ............ | 385/125 |
| 7,894,697 B2 | 2/2011 | Sasaki et al. | ............ | 385/127 |
| 7,995,888 B2 | 8/2011 | Gholami et al. | ............ | 385/122 |
| 8,009,950 B2 | 8/2011 | Molin et al. | ............ | 385/124 |
| 2002/0002845 A1 | 1/2002 | Fleury et al. | | |
| 2002/0174689 A1 | 11/2002 | Onishi et al. | | |
| 2003/0091308 A1 | 5/2003 | Uchiyama et al. | | |
| 2003/0128942 A1 | 7/2003 | DiGiovanni et al. | ............ | 385/123 |
| 2004/0069019 A1 | 4/2004 | Carter et al. | ............ | 65/414 |
| 2004/0228593 A1 | 11/2004 | Sun et al. | ............ | 385/127 |
| 2005/0094954 A1 | 5/2005 | Pickrell et al. | ............ | 385/123 |
| 2005/0126227 A1 | 6/2005 | Collaro | | |
| 2006/0034574 A1 | 2/2006 | Guan et al. | ............ | 385/125 |
| 2006/0263019 A1 | 11/2006 | Negishi et al. | ............ | 385/123 |
| 2007/0104437 A1 | 5/2007 | Bookbinder et al. | ............ | 385/125 |
| 2007/0116418 A1 | 5/2007 | Mishra | ............ | 385/123 |
| 2007/0196061 A1 | 8/2007 | Bickham et al. | ............ | 385/123 |
| 2008/0013905 A1 | 1/2008 | Bookbinder et al. | ............ | 385/124 |
| 2009/0052851 A1 | 2/2009 | Donlagic | ............ | 385/124 |
| 2009/0169163 A1* | 7/2009 | Abbott et al. | ............ | 385/127 |
| 2010/0303428 A1 | 12/2010 | Bickham et al. | ............ | 385/124 |
| 2011/0044596 A1 | 2/2011 | Zhang et al. | ............ | 385/124 |

FOREIGN PATENT DOCUMENTS

| | | |
|---|---|---|
| EP | 1 482 606 | 12/2004 |
| EP | 1 564 569 | 8/2005 |
| EP | 1 617 243 | 1/2006 |
| JP | S63185839 | 8/1988 |
| KR | 20090095247 | 9/2009 |
| WO | 02/075393 | 9/2002 |
| WO | 02/102730 | 12/2002 |
| WO | 2006/010798 | 2/2006 |
| WO | 2007043060 | 4/2007 |
| WO | 2008/005233 | 1/2008 |
| WO | 2008/013627 | 1/2008 |

OTHER PUBLICATIONS

D.J. Richardson, et al., "Advances in microstructured fiber technology," *Fibres and Optical Passive Components. Proceedings of 2005 IEEE/LEOS Workshop*, Jun. 22-24, 2005, pp. 1-9.

K. Okamoto, et al., "Analysis of Wave Propagation in Optical Fibers Having Core with αPower Refractive-Index Distribution and Uniform Cladding," *IEEE Transactions on Microwave Theory and Techniques*, Jul. 1976, vol. MTT-24, No. 7, pp. 416-421.

D. Gloge, "Bending Loss in Multimode Fibers with Graded and Ungraded Core Index," *Applied Optics*, Nov. 1972, vol. 11, No. 11, pp. 2506-2513.

S. Matsuo, et al., "Bend-insensitive and low-splice-loss optical fiber for indoor wiring in FTTH," *Optical Fiber Communication Conference*, 2004, Feb. 23-27, 2004, vol. 2, pp. 3-5.

H. Shinohara, "Broadband Access in Japan: Rapidly Growing FTTH Market," *IEEE Communications Magazine*, Sep. 2005, pp. 72-78.

N. Guan, et al., "Characteristics of Field confined holey fiber analyzed by boundary element method," *Optical Fiber Communication Conference and Exhibit*, Mar. 17-22, 2002, pp. 525-527.

C. Holton, et al., "Colloidal Quantum Dots Entrained in Microstructured Optical Fibers," *Fiber Lasers: Technology, Systems, and Applications, Proceedings of SPIE*, vol. 5335, pp. 258-265.

K. Okamoto, et al., "Computer-Aided Synthesis of the Optimum Refractive-Index Profile for a Multimode Fiber," *IEEE Transactions on Microwave Theory and Techniques*, vol. MTT-25, No. 3, Mar. 1977, pp. 213-221.

D. Kominsky, "Development of random hole optical fiber and crucible technique optical fibers," *OCLC FirstSearch: Detailed Record, Dissertation Abstracts Online*, 2005.

F.P.K. Ellis, "Fabrication of Random Hole Optical Fiber Preforms by Silica Sol-Gel Processing," *Thesis to be submitted to the Faculty of the Virginia Polytechnic Institute and State University*, Feb. 19, 2004, pp. 1-20.

G. Pickrell, et al., "Fiber Optic Chemical Sensing," *Sensors for Harsh Environments II, Proceedings of SPIE*, vol. 5998, Nov. 5, 2005, pp. 1-15.

D. Kominsky, et al., "Generation of random-hole optical fiber," *Optics Letters*, Aug. 15, 2003, vol. 28, No. 16, pp. 1409-1411.

T.M. Monro, et al., "Holey fibers with random cladding distributions," *Optics Letters*, Feb. 15, 2000, vol. 25, No. 4, pp. 206-208.

T.M. Monro, et al., "Holey fibers with randomly arranged air holes," *Lasers and Electro-Optics*, 2000, pp. 607-608.

J.C. Baggett, et al., "Improving bending losses in holey fibers," *Optical Fiber Communication Conference, Technical Digest*, Mar. 6-11, 2005, vol. 3, pp. 1-3.

Y. Bing, et al., "Low-loss Holey Fiber," *Hitachi Cable Review*, Aug. 2005, No. 24, pp. 1-5.

G. Pickrell, et al., "Microstructural Analysis of Random Hole Optical Fibers," *IEEE Photonics Technology Letters*, vol. 16, No. 2, Feb. 2004, pp. 491-493.

T. Ishigure, et al., "Modal Bandwidth Enhancement in a Plastic Optical Fiber by W-Refractive Index Profile," *Journal of Lightwave Technology*, vol. 23, No. 4, Apr. 2005, pp. 1754-1762.

R. Olshansky, "Mode Coupling Effects in Graded-Index Optical Fibers," *Applied Optics*, vol. 14, No. 4, Apr. 1975, pp. 935-945.

G.R. Pickrell, et al., "New fabrication technique for random-hole optical fibers," *Fiber Optic Sensor Technology and Applications III, Proc. of SPIE*, vol. 5589, pp. 257-265.

T.M. Monro, et al., "New possibilities with holey fibers," *Optical Fiber Communication Conference*, 2000, vol. 3, pp. 106-108.

G.R. Pickrell, et al., "Novel techniques for the fabrication of holey optical fibers," *Proceedings of the SPIE—The International Society for Optical Engineering*, vol. 4578, 2002, pp. 271-282.

D. Donlagić, "Opportunities to Enhance Multimode Fiber Links by Application of Overfilled Launch," *Journal of Lightwave Technology*, Nov. 2005, vol. 23, No. 11, pp. 3526-3540.

G.R. Pickrell, et al., "Random Hole Optical Fibers," *Industrial Highway Sensors Technology, Proceedings of SPIE*, vol. 5272, pp. 207-215.

G.R. Pickrell, et al., "Random-Hole Optical Fiber Evanescent-wave gas sensing," *Optics Letters*, vol. 29, No. 3, Jul. 1, 2004, pp. 1476-1478.

M. Geshiro, et al., "Truncated Parabolic-Index Fiber with Minimum Mode Dispersion," *IEEE Transactions on Microwave Theory and Techniques*, vol. MTT-26, No. 2, Feb. 1978, pp. 115-119.

PCT/US2011/066386 Search Report.

\* cited by examiner

METHOD OF MAKING A MULTIMODE OPTICAL FIBER

CROSS-REFERENCE TO RELATED APPLICATIONS

This application claims the benefit of priority under 35 U.S.C. §119 of U.S. Provisional Application Ser. No. 61/425,477 filed on Dec. 21, 2010, the contents of which is hereby incorporated by reference.

BACKGROUND

1. Field of the Invention

The present invention relates generally to the manufacture of optical fibers, and in particular a method of optimizing the bandwidth of multimode optical fibers.

2. Technical Background

To improve multimode optical fiber performance, bend insensitive multimode optical fibers have been developed. The fibers have improved the reliability of optical fiber communication systems, even when the highest order guided modes are excited. They are especially attractive for use in data center applications, where tight bends are a frequent necessity. While these designs may involve a depressed relative refractive index region, or "moat", adjacent to the core, the optical fiber shape parameter alpha ($\alpha$) must precisely match between the core and the moat regions. Any error at the core—moat interface may have a negative impact on the bandwidth of the optical fiber. To overcome this sensitivity, multimode optical fibers having an offset moat have also been developed. The selected offset is chosen such that relative delays of the outermost mode groups are minimized. However, even with an optimum offset, perturbations of the refractive index profile can still result in delay errors of the outermost guided mode groups, thereby potentially limiting bandwidth.

SUMMARY

In one aspect of the invention, a method of manufacturing a multimode optical fiber is disclosed comprising determining a refractive index profile n(r) of an optical fiber core preform at a predetermined (first) wavelength $\lambda$; selecting a core delta $\Delta_{fit}$, core radius $a_{fit}$ and core shape parameter $\alpha_{fit}$ that minimize the difference between n(r) and f(r)=n(0)[1−2$\Delta_{fit}$(r/$a_{fit}$)$^{\alpha_{fit}}$]$^{1/2}$; selecting a draw tension T that obtains (produces) a predetermined (target) optical fiber core shape parameter $\alpha_{fcr}$ from $\alpha_{fit}$; calculating a refractive index $n_{cl}$ at $\lambda$ of a cladding material obtained at a draw tension T (when the draw tension T is applied to the cladding material); calculating a relative refractive index profile of a (modeled) multimode optical fiber comprising optical fiber core shape parameter $\alpha_{fcr}$ relative to $n_{cl}$; calculating a target optical fiber core radius $a_t$ such that a (calculated) relative time delay at $\lambda$ of an outermost guided mode group (mode group guidable by a modeled multimode optical fiber) is minimized; depositing the cladding material on the optical fiber core preform to form an optical fiber preform; and drawing the multimode optical fiber from the optical fiber preform at tension T such that the multimode optical fiber comprises an outside diameter of 125±2 μm and a core with a radius substantially equal to $a_t$. For example, the predetermined (first) wavelength may be in a range from about 830 to about 870, in a range from about 840 to about 860. For example, the predetermined (first) wavelength may be about 850 nm. Preferably, no more than 18 mode groups guided by the multimode optical fiber have cutoff wavelengths greater than 850 nm.

In some embodiments the step of depositing cladding material comprises depositing a first cladding material on the core preform and depositing a second cladding material different from the first cladding material on the first cladding material. The second cladding material may comprise at least 0.5 wt. % fluorine.

In some embodiments the step of depositing cladding material comprises depositing a first cladding material having a first refractive index $n_1$ over the core preform, depositing a second cladding material having a refractive index $n_2$ less than $n_1$ on the first cladding material and depositing an outer cladding material over the second cladding material, and wherein the multimode optical fiber comprises a first cladding layer having a thickness $W_1$ and a second cladding layer different from the first cladding layer having a thickness $W_2$, wherein $W_1$ is greater than about 0.5 μm, and $W_2$ is greater than 1.0 μm and a refractive index of the outer cladding layer is $n_{cl}$.

In some embodiments the multimode optical fiber comprises a first inner cladding layer, a second inner cladding layer over the first cladding layer and an outer cladding layer over the second cladding layer, and a relative refractive index difference $\Delta_1$ of the first cladding layer relative to the outer cladding layer is in a range from about −0.1% to about 0.1% and a relative refractive index difference $\Delta_2$ of the second cladding material relative to the outer cladding layer is equal to or less than −0.2%. The second cladding layer may comprise at least 0.5 wt. % fluorine.

Preferably, a core shape parameter of the optical fiber core preform is in a range from about 1.8 to about 2.3, in a range from about 1.9 to about 2.2, in a range from about 2.0 to about 2.2, or in a range from about 2.05 to about 2.15.

The multimode optical fiber preferably comprises a first inner cladding layer having a width $W_1$ greater than 0.5 μm and a relative refractive index difference $\Delta_1$ relative to an outer cladding layer between −0.1% and 0.1%, and a second inner cladding layer over the first inner cladding layer, wherein the second inner cladding layer has a width $W_2$ greater than 1.0 μm and a relative refractive index difference $\Delta_2$ relative to an outer cladding layer less than −0.2%. A maximum relative refractive index difference of the multimode optical fiber core relative to an outer cladding layer is preferably equal to or less than 1.05% and a radius of the multimode optical fiber core equal to or greater than 23.0 μm.

Preferably, a core shape parameter of the optical fiber is in a range from about 1.8 to about 2.3, in a range from about 1.9 to about 2.2, in a range from about 2.0 to about 2.2, or in a range from about 2.05 to about 2.15.

In another embodiment, a method of manufacturing a multimode optical fiber is disclosed comprising determining a refractive index profile of a core preform at a predetermined (first) wavelength $\lambda$ to obtain a shape parameter $\alpha_{pcr}$ and a maximum relative refractive index difference $\Delta_{pcr}$ of the core preform; determining a target draw tension for obtaining (producing) a predetermined (target) optical fiber shape parameter $\alpha_{fcr}$ from $\alpha_{pcr}$; calculating an optical fiber core relative refractive index difference $\Delta_{fcr}$ at $\lambda$ obtained from $\Delta_{pcr}$ with the target draw tension; using $\Delta_{fcr}$ to calculate a target core radius $a_t$ that minimizes a (calculated) relative time delay $\Delta\tau$ of an outermost guided mode group (mode group guidable by a modeled multimode optical fiber) at the predetermined (first) wavelength; forming an outer cladding over the core preform to form an optical fiber preform; and drawing the multimode optical fiber comprising a core and a cladding from the optical fiber preform at the target draw tension such that the multimode optical fiber comprises an outside diameter of 125±2 μm and a radius of the core is substantially equal to $a_t$. Preferably, no more than 18 modes groups guided by the multimode optical fiber have cutoff wavelengths greater than 850 nm.

In some embodiments a maximum relative refractive index difference of the multimode optical fiber core relative to the outer cladding is equal to or less than 1.05% and a radius of the multimode optical fiber core is equal to or greater than 23.0 μm.

Preferably, the maximum relative time delay Δτ of the outermost guided mode group (mode group guidable by a modeled multimode optical fiber) at the propagating wavelength is equal to or less than about 1.0 ns/km, for example, equal to or less than about 0.20 ns/km, equal to or less than about 0.14 ns/km, equal to or less than about 0.1 ns/km, equal to or less than about 0.09 ns/km, or equal to or less than about 0.085 ns/km, or equal to or less than about 0.080 ns/km. The predetermined (first) wavelength may be, for example, in a range from about 830 to about 870 or in a range from about 840 to about 860. For example, the predetermined (first) wavelength may be about 850 nm.

In still another embodiment, a method of making a multimode optical fiber is disclosed comprising determining a refractive index profile n(r) of an optical fiber core preform at 850 nm; selecting a core delta $\Delta_{fit}$, core radius $a_{fit}$ and core shape parameter $\alpha_{fit}$ that minimize the difference between n(r) and $f(r)=n(0)[1-2\Delta_{fit}(r/a_{fit})^{\alpha_{fit}}]^{1/2}$ from $r=0.15a_{fit}$ to $r=0.95a_{fit}$; selecting a draw tension T that obtains (produces) a predetermined (target) optical fiber core shape parameter $\alpha_{fcr}$ from $\alpha_{fit}$; calculating a refractive index $n_{cl}$ at 850 nm of a cladding material obtained at draw tension T (when the draw tension T is applied to the cladding material); calculating a relative refractive index profile of a (modeled) multimode optical fiber comprising optical fiber core shape parameter $\alpha_{fcr}$ relative to $n_{cl}$, where $$\Delta_{fcr}(r) = \frac{n^2(r) - n_{cl}^2}{2n^2(0)};$$

calculating a target optical fiber core radius $a_t$; determining a thickness of the cladding material to deposit on the optical fiber core preform to obtain $a_t$ in a multimode optical fiber drawn from an optical fiber preform comprising the optical fiber core preform, wherein an outside cladding diameter of the multimode optical fiber is 125 μm; depositing the cladding material to the determined thickness on the optical fiber core preform to form the optical fiber preform; and drawing the multimode optical fiber from the optical fiber preform at tension T.

In some embodiments the step of depositing cladding material comprises depositing a first cladding material on the core preform and depositing a second cladding material different from the first cladding material and comprising at least 0.5 wt. % fluorine on the first cladding material.

Preferably, the multimode optical fiber comprises a first cladding layer having a thickness $W_1$ and a second cladding layer different from the first cladding layer having a thickness $W_2$, wherein $W_1$ is greater than about 0.5 μm, and $W_2$ is greater than about 1.0 μm.

Preferably, a relative refractive index difference $\Delta_1$ of the first cladding layer relative to an outer cladding layer is in a range from about −0.1% to about 0.1% and a relative refractive index difference $\Delta_2$ of the second cladding layer relative to the outer cladding layer is equal to or less than −0.2%.

Preferably, no more than 18 mode groups guided by the multimode optical fiber have cutoff wavelengths greater than 850 nm.

In still another embodiment, a method of manufacturing a multimode optical fiber is described comprising providing a core preform; determining a refractive index profile of the core preform at a wavelength λ of 850 nm; determining guided mode groups (mode groups guidable by a modeled multimode optical fiber) at λ for a plurality of different multimode optical fiber core radii and calculating (calculated) relative time delays for the guided mode groups (mode groups guidable by a modeled multimode optical fiber); calculating a threshold radius $a_{th}$ at which no more than 18 mode groups are guided by the multimode optical fiber core at λ; selecting a target multimode optical fiber core radius $a_t$ equal to or less than $a_{th}$ such that a time delay at λ of an outermost guided mode group (mode group guidable by a modeled multimode optical fiber) is minimized; forming a cladding layer on the core preform to form an optical fiber preform; and drawing the multimode optical fiber from the optical fiber preform, wherein an outside diameter of the multimode optical fiber is 125±2 μm and the core diameter is substantially equal to $a_t$. A shape parameter $\alpha_{pcr}$ of the core preform refractive index profile may be, for example, in a range from about 1.8 to 2.3. Preferably, $a_t$ is $\geq(a_{th}-0.5\delta a_{th})$. Preferably, at least 16 mode groups are guided by the multimode optical fiber core.

Preferably, a maximum relative time delay of the outermost guided mode group is equal to or less than about 1.0 ns/km, for example, equal to or less than about 0.20 ns/km, equal to or less than about 0.14 ns/km, equal to or less than about 0.1 ns/km, equal to or less than about 0.09 ns/km, or equal to or less than about 0.085 ns/km, or equal to or less than about 0.080 ns/km.

Preferably, a core shape parameter of the multimode optical fiber is in a range from about 1.8 to about 2.3, in a range from about 1.9 to about 2.2, in a range from about 2.0 to about 2.2, or in a range from about 2.05 to about 2.15.

In some embodiments the step of forming a cladding layer comprises forming a first inner cladding layer around the core preform, wherein the first inner cladding layer has a width $W_1$ greater than 0.5 μm and a relative refractive index difference $\Delta_1$ relative to an outer cladding layer between −0.1% and 0.1%, and forming a second inner cladding layer over the first inner cladding layer, wherein the second inner cladding layer has a width $W_2$ greater than 1.0 μm and a relative refractive index difference $\Delta_2$ relative to an outer cladding layer less than −0.2%.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
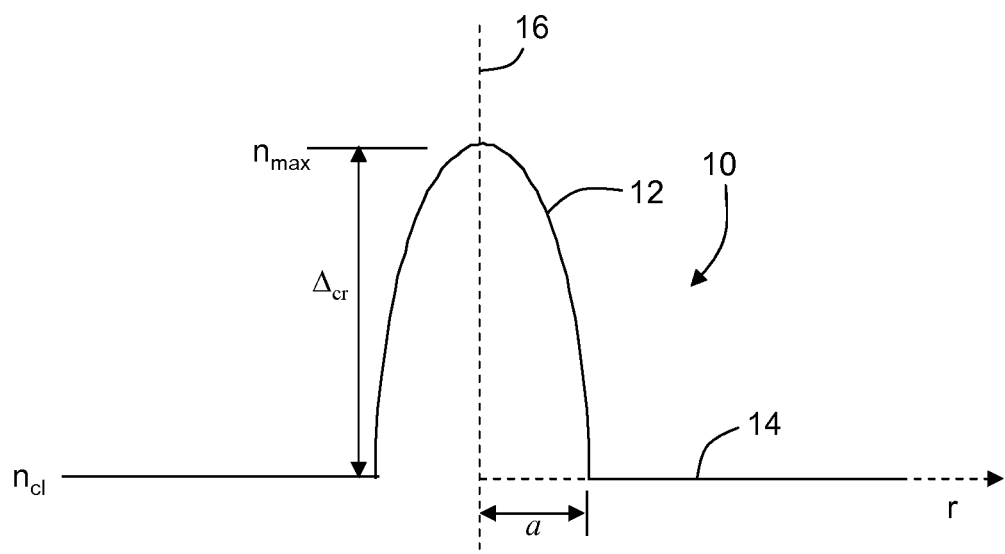
FIG. 1 is an illustration of a refractive index profile for an example standard multimode optical fiber with a graded index core and a constant refractive index cladding.

Reference will now be made in detail to embodiments of the invention, examples of which are illustrated in the accompanying drawings. Whenever possible, the same reference numeral will be used throughout the drawings to refer to the same or like parts.

The "relative refractive index difference" $\Delta$ is defined as $\Delta = 100 \times (n_i^2 - n_{REF}^2)/2n_i^2$, where $n_i$ is the maximum refractive index in region i, unless otherwise specified herein. The relative refractive index difference is measured at 850 nm unless otherwise specified. The relative refractive index difference is typically referred to simply as "delta". Unless otherwise specified, $n_{REF}$ is the average refractive index of the outermost annular region of the cladding, which can be calculated, for example, by taking "N" index measurements ($n_{c l1}$, $n_{c l2}$, ... $n_{cN}$) in the outermost annular region of the cladding (which in some embodiments may be undoped silica), and calculating the average refractive index by:

$$n_{cl} = (1/N) \sum_{i=1}^{i=N} n_{ci} \quad (1)$$

As used herein, the relative refractive index difference represented by $\Delta$ and its values are given in units of "%", unless otherwise specified. In cases where the refractive index of a region is less than the reference refractive index $n_{REF}$, the relative refractive index difference is negative and the region is referred to as a depressed index region or depressed-index, and the minimum relative refractive index difference is calculated at the point at which the relative refractive index difference is most negative unless otherwise specified. In cases where the refractive index of a region is greater than the reference index $n_{REF}$, the relative refractive index difference is positive and the region can be said to have a raised or positive refractive index.

Unless otherwise stated, bandwidth is measured under overfilled launch conditions at 850 nm (unless another wavelength is specified) according to IEC 60793-1-41 (TIA-FOTP-204), Measurement Methods and Test Procedures—Bandwidth. The minimum calculated effective modal bandwidths (Min EMBc) were obtained from measured differential mode delay spectra as specified by IEC 60793-1-49 (TIA/EIA-455-220), Measurement Methods and Test Procedures—Differential Mode Delay.

As used herein, numerical aperture (NA) of an optical fiber means numerical aperture as measured using the method set forth in IEC-60793-1-43 (TIA SP3-2839-URV2 FOTP-177) titled "Measurement Methods and Test Procedures—Numerical Aperture". The NA has a core component, $NA_{core}$, which is directly related to the core delta $\Delta_{cr}$ (referenced to the refractive index of the outer region of the cladding) through the equation:

$$NA_{core} = n_{cl} \sqrt{\frac{2\Delta_{cr}}{1 - 2\Delta_{cr}}} \quad (2)$$

As used herein, the term relative refractive index profile refers to the relative refractive index difference as a function of radius from the centerline of a waveguide. For a graded refractive index waveguide the relative refractive index profile can be expressed as $\Delta(r)$, which is in units of "%", where r is radius, and follows the equation, $$\Delta(r) = \Delta(r_o)(1 - [|r - r_o|/(r_1 - r_o)]^\alpha), \quad (3)$$

where $r_o$ is the point at which $\Delta(r)$ is maximum, $r_1$ is the point at which $\Delta(r)$ is zero with respect to an outer annular cladding region, and r is in the range $r_i \leq r \leq r_f$, where $\Delta$ is defined supra, $r_i$ is the initial point of the profile, $r_f$ is the final point of the profile, and the exponent $\alpha$ is a shape parameter that is a real number defining the shape of the region between $r_i$ and $r_f$. For a profile segment beginning at the centerline (r=0), the relative refractive index profile can be expressed in the simpler form $$\Delta(r) = \Delta(0)(1 - [|r|/(r_1)]^\alpha), \quad (4)$$

where $\Delta(0)$ is the refractive index delta at the centerline. The relative refractive index difference for a given preform can be measured using a refractive index measurement technique such as a Preform Analyzer refractive index measurement system (Photon Kinetics Instruments, Beaverton, Oreg.).

The optical core diameter $2a_{opt}$ is measured using the technique set forth in IEC 60793-1-20, titled "Measurement Methods and Test Procedures—Fiber Geometry", in particular using the reference test method outlined in Annex C thereof titled "Method C: Near-field Light Distribution." To calculate the optical core radius "$a_{opt}$" from the results using this method, a 10%-80% fit was applied per section C.4.2.2 of IEC 60793-1-20 to obtain the optical core diameter, which is then divided by 2 to obtain the optical core radius.

In some embodiments, the core comprises silica doped with germanium, i.e. germania ($GeO_2$) doped silica. Dopants other than germanium such as $Al_2O_3$ or $P_2O_5$, singly or in combination, may be employed within the core, and particularly at or near the centerline of the optical fiber disclosed herein to obtain the desired refractive index and density. In some embodiments, the refractive index profile of the optical fiber disclosed herein is non-negative from the centerline of the optical fiber to the outer radius of the optical fiber core. In some embodiments, the optical fiber contains no index-decreasing dopants in the core.

Multimode optical fibers propagate many modes. The majority of the optical power transmitted by the optical fiber is carried in the core region by higher order modes at wavelengths well-removed from their cutoff wavelength. These guided modes can be represented by a radial mode number m and an azimuthal mode number n. As used herein, the term "mode group" refers to collections of degenerate modes. Modes are said to be degenerate when they have the same, or substantially the same cutoff wavelength and propagation characteristics. A mode group is represented by an integer number, the principal mode number P, where P=2m+n+1. The total number of propagating mode groups Q can be calculated from $Q=(2V/\pi)^{1/2}$, where V is the normalized frequency. As used herein, a multimode fiber is defined as an optical fiber that guides at least six mode groups. The total number of individual guided modes M can be calculated from the expression $$M = \frac{2\alpha}{\alpha+2}\left(\frac{\pi a}{\lambda}\right)^2 (NA_{core})^2,$$

where a is the core radius, $\alpha$ is the core shape parameter and $NA_{core}$ is the core component of the numerical aperture of the optical fiber as described above. The expressions for Q and M are strictly valid within the WKB approach for an infinitely large core (in which there is an infinitely small distance between the modes), but still provide an accurate estimate for the number of mode groups and modes for the fiber designs described herein.

It is generally known that modal dispersion in a standard multimode optical fiber is minimized by the application of the shape parameter $\alpha$ for an optical fiber having a refractive index profile defined by n(r) where n(r) is given by $$n(r)=n_{max}(1-2\Delta(r/a)^\alpha)^{1/2} \text{ for } r<a, \text{ and} \quad (5)$$

$$n(r)=n_{max}(1-2\Delta)^{1/2} \text{ for } r \geq a, \quad (6)$$

where r as above is a coordinate or distance in the radial direction of a cylindrical waveguide (e.g. optical fiber) measured from the centerline of the waveguide and where n(r) is the refractive index of the waveguide at radial distance r from the centerline and $n_{max}$ is the maximum refractive index of the waveguide.

Shown in FIG. 1 is a relative refractive index profile for an exemplary standard multimode optical fiber 10 illustrating a core region 12 with radius "a" and having a peak refractive index $n_{cr}$ in the core region (equivalent to $n_{max}$ above) and a cladding region 14 having a refractive index $n_{cl}$. The refractive index profile of FIG. 1 graphically represents the relationship between relative refractive index difference and radial distance "r" from centerline 16. Accordingly, $\Delta_{cr}$ represents the maximum relative refractive index (delta) of core region 12 in FIG. 1. The relative refractive index profile of standard multimode optical fibers comprises a graded index core defined by equation (4) that describes a refractive index profile of an optical fiber core, and a cladding with a constant refractive index $n_{cl}$. The core shape parameter $\alpha$ of the profile is typically about 2, depending on the wavelength for which the optical fiber is optimized. However, a conventional relative refractive index profile does not allow for minimization of the highest order guided mode group time delays when compared to the lower order guided modes.

Basic methods of producing silica-based optical fiber preforms are well known in the art. One such method comprises forming all the material necessary for the manufacture of the bare (uncoated) optical fiber into a singular body, the optical fiber preform, optionally heating the optical fiber preform to consolidate at least a portion of the preform into a solid glass optical fiber preform, then heating the solid optical fiber preform in a furnace and drawing the optical fiber preform into an optical fiber. For example, a traditional inside vapor deposition method can be used where a precursor material is heated within a glass cladding tube such that layers of glass are deposited inside the tube. The layers of glass may comprise layers of cladding glass, layers of core glass or both core and cladding glass. When a sufficient number of layers are deposited, thereby forming an optical fiber preform, the optical fiber preform is removed and placed within a drawing apparatus. Optionally, the tube may form only a portion of the cladding, wherein the tube with the deposited glass on an interior thereof may form a core preform. Additional glass may be formed on an exterior of the core preform to form an optical fiber preform. The optical fiber preform is heated in a furnace comprising the drawing apparatus and an optical fiber is drawn therefrom.

In another method, an optical fiber core preform may be produced by chemical vapor deposition wherein precursor materials are burned in a flame to generate and deposit silica-containing glass soot onto a target rod. The soot may comprise core glass soot, cladding glass soot, or both core and cladding glass soot. For example, the target rod can be a ceramic (e.g. alumina) rod. Once the glass soot is deposited, the target rod is removed. The resultant soot body is porous and fragile. If needed, the porous body can be chemically dried to remove water (typically in the form of the hydroxyl ion OH), and is thereafter heated to consolidate the soot into a clear glass optical fiber preform.

In some operations, a core preform is separately manufactured. That is, core glass soot is deposited onto a target rod as previously described. Dopants incorporated into the precursor materials are used to adjust the refractive index of the deposited material. The target rod is removed and the fragile porous preform thereafter heated to consolidate the porous preform into a solid, clear glass core preform. If needed, the core preform can be chemically dried to remove water (typically in the form of the hydroxyl ion OH). After consolidation, the core preform may then be heated in a furnace and drawn into a slender rod or cane. The resultant rod can be segmented to form a plurality of individual core rods or core canes. Each core cane may contain only core material, or, during the forming process additional material, such as cladding material, may be added such that the core rod includes at least a portion of the cladding material.

In a subsequent step, a core cane serves as a target rod for another step wherein additional silica-containing soot is formed onto the core cane. For example, the additional material may be core material, cladding material or both core material and cladding material. The thus-formed composite body of core cane and soot is then heated to consolidate the cladding material into a solid, clear cladding to produce an optical fiber preform. In other methods, layers surrounding the core portion, such as the cladding, may be added by surrounding the core rod with one or more preformed tubes or sleeves. In some embodiments, both tubes and soot deposition may be used to form the additional portions of the optical fiber preform, e.g. cladding material. It should be noted that the cladding material can be a single cladding material having a single refractive index, or the cladding material can be multiple cladding materials formed as different layers, wherein each cladding material may have a different refractive index than another cladding material applied to the preform. For example, a cladding material may be doped to modify a refractive index of the cladding material. Fluorine, for example, is one material often used to reduce a refractive index of a cladding material. Chlorine, for example, is one material that may be used to increase a refractive index of a cladding material.

Figure 2:
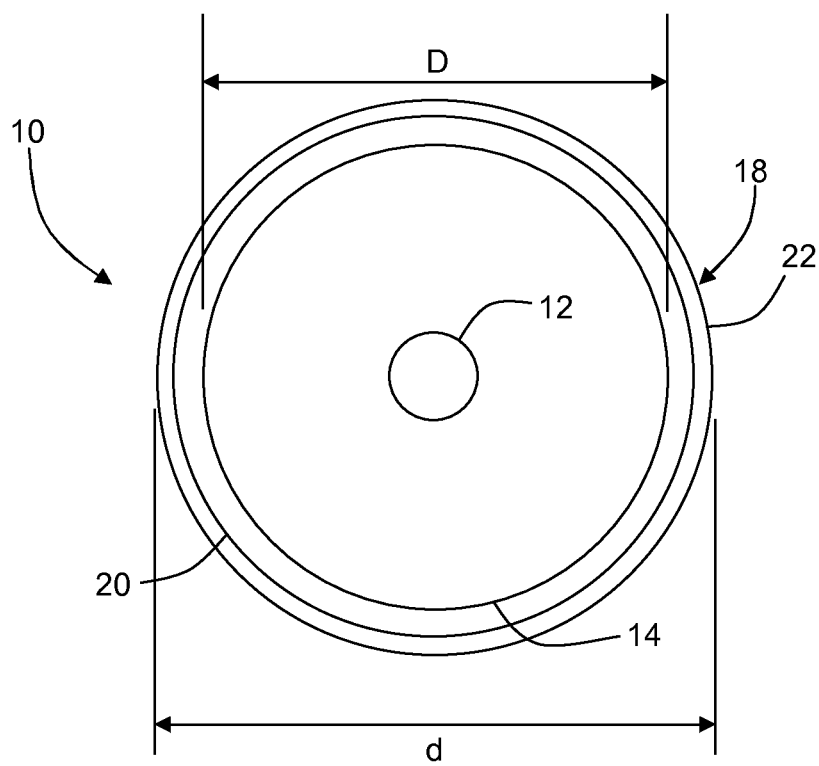
FIG. 2 is a cross sectional view of an optical fiber represented by the refractive index profile of FIG. 1 showing a coating disposed about the optical fiber.

Once formed, the completed optical fiber preform comprising both core material and cladding material is drawn into an optical fiber comprising a core and one or more cladding layers surrounding the core. The outermost cladding layer of the optical fiber is typically surrounded and contacted by at least one coating, typically a polymer such as an acrylate that may in some embodiments comprise a low modulus primary coating in contact with the cladding glass of the optical fiber and a high modulus secondary coating deposited over the primary coating. The at least one polymer coating is typically applied during the drawing process. In some embodiments, the outermost cladding layer has an outer diameter D in a range from about 120 to about 130 µm, in a range from about 123 µm to about 127 µm, or in a range from about 124 µm to about 126 µm. A nominal cladding diameter may be, for example, 125 µm. However, other overall cladding diameters may be produced as desired for a particular application. A nominal diameter "d" of the coating layer may be, for example, 245 µm, however the thickness of the polymer coating layer may be adjusted according to the application of the optical fiber. Referring to FIG. 2, a cross sectional view of the optical fiber of FIG. 1 is shown illustrating core region 12, cladding layer 14 and polymer coating 18 comprising primary coating layer 20 and secondary coating layer 22.

Figure 3:
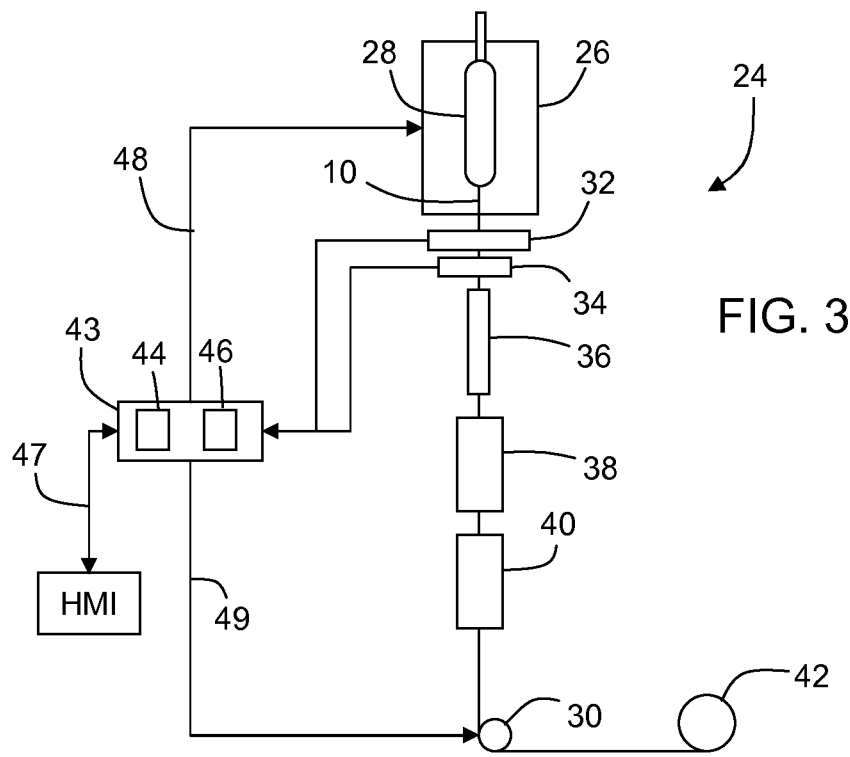
FIG. 3 is a schematic view of an optical fiber draw production system.

In either of the above cases, whether a single step process or a multi-step process, drawing of the optical fiber is carried out in a similar fashion. An exemplary draw production system 24 is shown in FIG. 3, according to one embodiment. The draw production system 24 includes a draw furnace 26 that is heated to a temperature of about 2,000° C., according to one embodiment. A preform 28 is disposed vertically in draw furnace 26 wherein draw furnace 26 supplies heat to at least the bottom portion of the preform. Glass may then be drawn from the heated portion of the preform. If the preform is a core preform, the drawn glass may be a core rod comprising at least a core portion. Alternatively, the core preform may include at least a portion of a cladding material. If the preform is an optical fiber preform a thin strand of glass, the optical fiber, is drawn from the optical fiber preform and wound onto a receiving spool.

Preform 28 may be constructed of any glass material and may be doped and otherwise processed suitable for the manufacture of optical fibers. Preform 28 may be an entire core preform having a core with cladding material disposed thereon or preform 28 may be any optical fiber preform produced from an original precursor core preform. In some embodiments two or more optical fiber preforms, such as five optical fiber preforms, may be formed from a single core preform for use in the furnace 26 to draw optical fiber. For example, an original core preform may be drawn to produce multiple core canes, wherein each core cane is used as the target rod of a subsequent optical fiber preform. For the remainder of the discussion regarding FIG. 3, it will be assumed preform 28 as illustrated in FIG. 3 is an optical fiber preform and an optical fiber is drawn from the optical fiber preform.

It should be appreciated that each individual optical fiber preform may have a different refractive index measurement as it contains a different core cane than the core cane of another optical fiber preform. It is generally difficult to produce a given core preform with an optimum shape parameter, hereinafter designated $\alpha_{pcr}$, that extends the entire length of the core preform because of normal manufacturing variations in the processing of the core preform and drawing of the core preform. Thus, a single core preform may yield individual core canes having differing values for the core preform shape parameter $\alpha_{pcr}$. The shape parameter $\alpha_{pcr}$ for a given core preform can be measured using a refractive index measurement apparatus such as a Preform Analyzer refractive index measurement system (Photon Kinetics Instruments, Beaverton, Oreg.) and a desired profile can be achieved to provide for a tuned preform.

During the drawing of an optical fiber, the optical fiber 10 is pulled from a bottom portion of optical fiber preform 28 by tractor 30. After leaving furnace 26, the bare optical fiber 10 encounters a diameter monitor 32 that provides a signal used in a feedback control loop to regulate a speed of tractor 30 and maintain a constant fiber diameter. The bare optical fiber 10 then passes through a fiber tension measurement device 34 that measures the tension of the optical fiber 10 and provides a feedback control loop to regulate the tension of optical fiber 10 and maintain a desired draw tension setting. One example of a fiber tension measurement device 34 is disclosed in EP0479120A2 which is hereby incorporated herein by reference.

Once the bare optical fiber 10 is drawn from optical fiber preform 28, the bare optical fiber 10 is cooled in a cooling tube 36 or other treatment device that may be coupled to or remote from the exit of furnace 26, after which fiber 10 is coated by coater 38 that can apply a polymeric-based coating material to the outside surface of the bare optical fiber 10. The coated optical fiber may also pass through a coating curing apparatus 40 that cures the polymeric coating. The coated fiber 10 is then wound onto a spool or reel 42. Various optical attributes of the optical fiber, including the bandwidth are typically measured off-line.

The draw production system 24 is also shown having a tension controller 43 that may be implemented as a computer having a microprocessor 44 and memory 46, according to one embodiment. It should be appreciated that any digital and/or analog processing circuitry and memory storage medium may be employed. Tension controller 43 receives the output of diameter monitoring device 32 and the output of the fiber tension measurement device 34 and may process the inputs with one or more software programs. Tension controller 42 also provides an output 47 such as to a display or other human machine interface (HMI), for a user to view tension values indicative of the draw tension for each fiber wound on each reel, e.g., $T_{R1}$, $T_{R2}$, $T_{R3}$, etc. It should be appreciated that optical fiber may be drawn from an optical fiber preform at different fiber tensions to achieve different values of the optical fiber core shape parameter $\alpha_{fcr}$ and hence may result in different bandwidth characteristics for the optical fibers. A user selected target tension T is provided as an input to tension controller 43 (such as through the HMI) to allow a user to select a desired target tension (set point) to achieve a desired bandwidth characteristic of the optical fiber being produced. Tension controller 43 generates a temperature control output 48 in response to the user selected target tension that may be used to control the temperature of furnace 26. The temperature control may adjust the temperature of furnace 26 to achieve the desired fiber draw tension, according to one embodiment. Typically, an increase in the temperature of furnace 26 will cause a decrease in the tension of the drawn fiber, whereas a decrease in the temperature of furnace 26 will cause an increase in the tension of the drawn fiber. The temperature of the furnace may be adjusted with a feedback loop until the draw tension reaches the user selected tension set point. It should be apparent that the draw furnace temperature comprises a slow feedback loop as the furnace temperature changes relative slowly.

According to another embodiment, the tension of the drawn fiber may be adjusted through speed control output 49 from tension controller 43 to tractor 30. The rotational speed of tractor 30 controls the linear speed of the fiber being drawn by tractor 30. Tractor 30 may be controlled by tension controller 43 responsive to the user selected target tension.

During the manufacture of a graded index multimode optical fiber, the amount and/or type of refractive index modifying dopants added during the formation of the core is varied as a function of radial distance "r". That is, as the radius of the core increases, dopants added to the precursor materials are adjusted to obtain a gradually decreasing refractive index as a function of radial distance "r" from the core centerline. As previously described, in some embodiments the core comprises germania ($GeO_2$) doped silica. Dopants other than germania such as $Al_2O_3$ or $P_2O_5$, singly or in combination, may be employed within the core, and particularly at or near the centerline of the optical fiber to obtain the desired refractive index and density. In some embodiments, the refractive index profile of the multimode optical fiber is non-negative from the centerline to the outer radius of the core. In some embodiments, the optical fiber contains no index-decreasing dopants in the core Preferably, the refractive index profile of the optical fiber core has a parabolic (or substantially parabolic) shape. The parabolic shape of the core extends from the centerline of the core to outer radius r=a of the core. As used herein, "parabolic" therefore includes substantially parabolically shaped refractive index profiles that may vary slightly from an $\alpha$ of about 2, for example 2.0, 2.05, 2.15 or 2.2, at one or more points in the core, as well as profiles with minor variations and/or a centerline dip (a refractive index decrease at the centerline of the core). For example, the relative refractive index profile of the optical fiber core may have a shape wherein the core shape parameter $\alpha$ is preferably in a range from about 1.8 to about 2.3, in a range from about 2.0 to about 2.2, or in a range from about 2.05 and 2.15, as measured at a wavelength of 850 nm. Thus, as used herein, "about 2" refers to a core shape parameter $\alpha$ between 1.8 and 2.3. In some embodiments, the refractive index profile of the core may exhibit a centerline dip wherein the maximum refractive index of the core, and the maximum refractive index of the entire optical fiber, is located a small distance away from the centerline. But in other embodiments the refractive index of the core has no centerline dip, and the maximum refractive index of the core, and the maximum refractive index of the entire optical fiber, is located at the centerline of the core.

In a multimode optical fiber having a generally parabolic relative refractive index profile with a core shape parameter $\alpha$ of about 2, and a cladding with a substantially uniform refractive index, the highest order modes guided in the optical fiber are leaky modes, and prone to being eliminated within a fairly short distance in a cabled optical fiber, or a fiber configured with bends, such as might be found in a data distribution center. Thus, the occurrence of intermodal distortion that can reduce the information carrying capacity of the optical fiber, or bandwidth, is lessened. However, newer generations of multimode optical fibers, and in particular bend-insensitive optical fibers such as those comprising a depressed refractive index ring about the core, may bind even the highest order modes more tightly that earlier generation fibers. Thus, bandwidth in these bend insensitive fibers can be undesirably reduced.

A core preform destined to form the target for the addition of cladding material, such as a core rod or cane, may be individually measured during the manufacturing process for basic physical and/or optical attributes. Such attributes include the shape parameter of the core preform, $\alpha_{pcr}$, and the refractive index delta of the core preform, $\Delta_{pcr}$. Using $\alpha_{pcr}$ and $\Delta_{pcr}$, the amount of cladding to add to the core preform to achieve a predetermined target core radius when the optical fiber preform is drawn to a specified cladding diameter can be calculated, since the cladding and core decrease in dimensions, such as diameter, proportionally during the optical fiber drawing process. The cladding material is often deposited according to weight, which, if the cladding material is uniformly deposited, is directly associated with a thickness.

The predetermined target core radius is typically set by customer specifications or national and/or international standards for a particular optical fiber type. For example, multimode optical fibers have internationally recognized nominal core diameters, including 50 μm core diameter optical fibers and optical fibers having a nominal core diameter of 62.5 μm. In accordance with the foregoing, and using a nominal 50 μm core diameter multimode optical fiber as an example, sufficient cladding material is added to the core preform such that, when drawn to an overall cladding diameter of, for example, 125 μm, the core diameter of the drawn optical fiber is a nominal 50 μm (nominal 25 μm core radius). This means that for a population of optical fibers, the mean core diameter of the population of optical fibers is 50 μm, with other core diameters distributed on each side of the mean. Thus, for an optical fiber required to meet a nominal core diameter specification of 50 μm±2 μm, a manufacturing distribution is produced that is centered at about 50 μm, with some small but finite distribution about this nominal core diameter. Preferably, the optical fiber has a core diameter (CD)±2 μm, more preferably CD is ±2 μm such that CD-2 μm≤CD≤CD+2 μm, more preferably CD-1 μm≤CD≤CD+1 μm. To enable a cost effective manufacturing process, every attempt is made to produce a core diameter distribution that is tightly centered about the nominal core diameter.

As the core diameter, and available mode volume increases, the number of guided modes increases accordingly. It has previously been thought that increases in core diameter yield lower bandwidths due to the increase in guided modes. As described in more detail below, the inventors herein have found that increases in core diameter do not necessarily lead to reduced bandwidth, and that bandwidth can be maximized by varying the draw parameters of an optical fiber to obtain an optimal core diameter for a given nominal design. Moreover, varying the core diameter can be combined with varying the draw tension to correct for tension effects on bandwidth.

Figure 4:
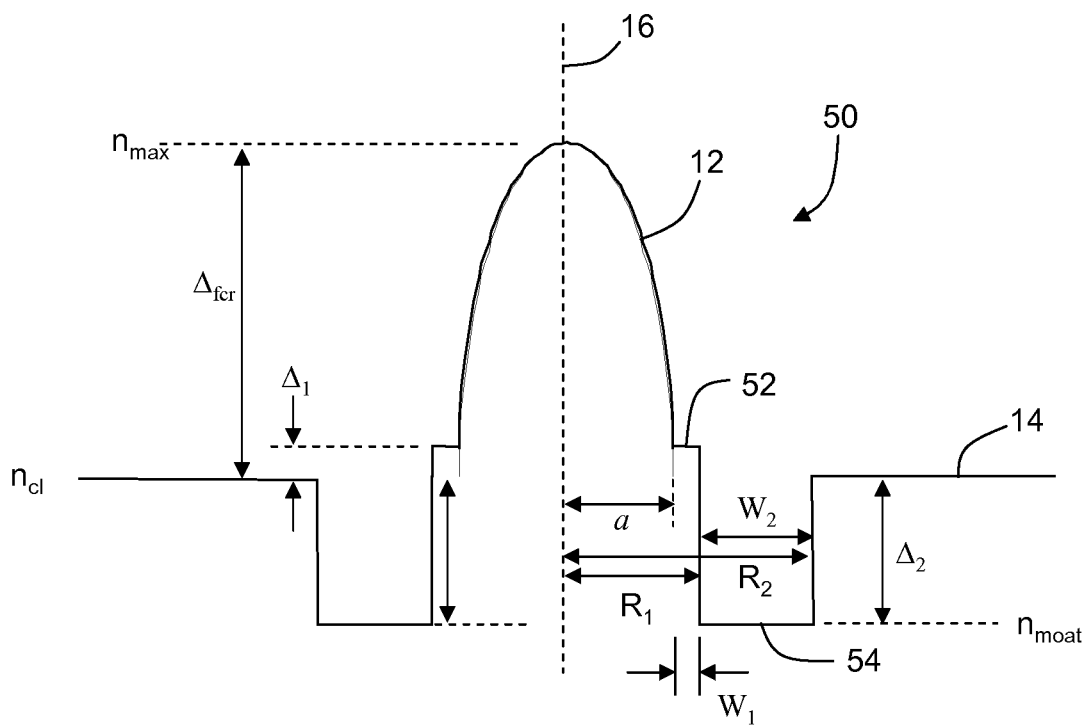
FIG. 4 is an illustration of a refractive index profile for an example bend insensitive multimode optical fiber comprising a depressed cladding ring.

FIG. 4 shows an exemplary refractive index profile for a bend-insensitive multimode optical fiber 50 according to one embodiment. The multimode optical fiber of FIG. 4 comprises a graded refractive index core region 12 ending at radius r=a, which marks the end of the graded index core or parabolic shape extending from the centerline 16 ($r=r_0$). Core region 12 is surrounded by and in direct contact with a first annular portion 52, which has a minimum relative refractive index difference $\Delta_1$. First annular portion 52 may be referred to as a first inner cladding layer. First annular portion 52 is surrounded by and in direct contact with a second annular portion 54 having a depressed, minimum relative refractive index difference $\Delta_2$. Second annular portion 54 may be referred to as a second inner cladding layer. The material of the second inner cladding layer may comprise at least 0.5 wt. % fluorine. First annular portion 52 also represents an offset (distance) $W_1$, which is the thickness or width of the first annular portion, between core region 12 and depressed portion 54. Outer cladding region 14 surrounds and is in direct contact with second annular portion 54. Shape parameter $\alpha_{fcr}$ of core region 12 has a value of about 2 to minimize time delays of the guided mode groups.

Figure 5A:
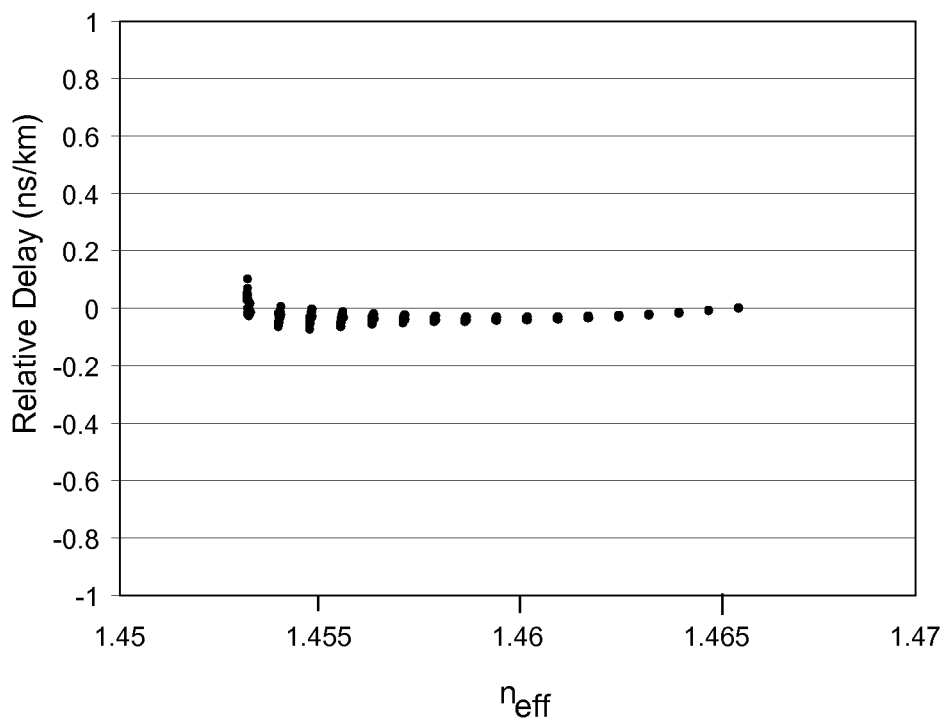
FIGS. 5A-5F are plots showing relative time delay as a function of effective refractive index experienced by light propagating through an optical fiber for a variety of different core radii.
Figure 5B:
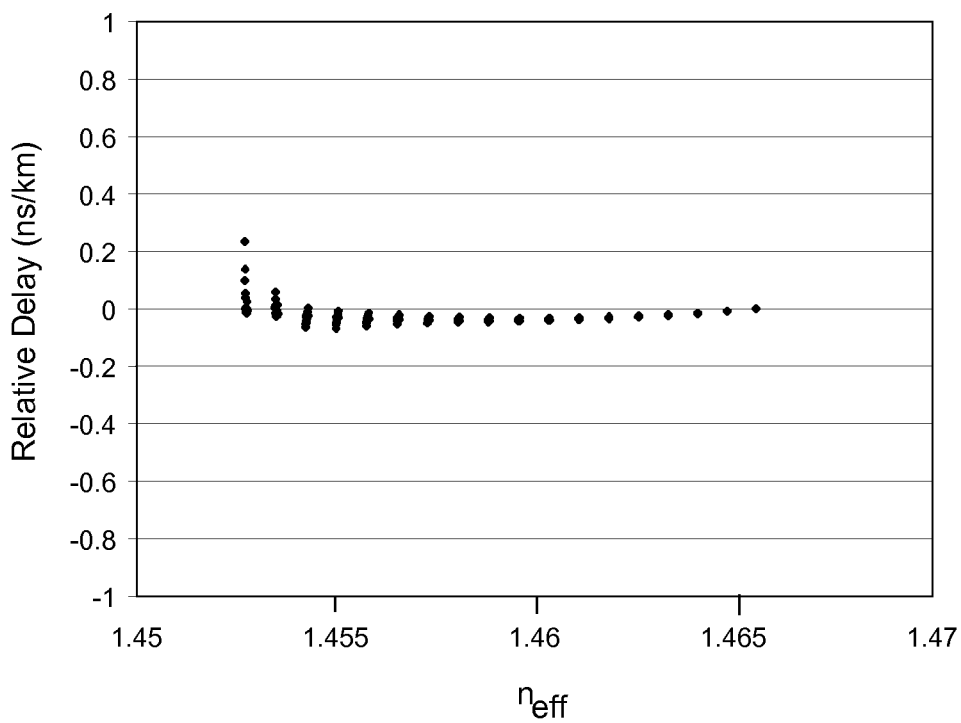
Figure 5C:
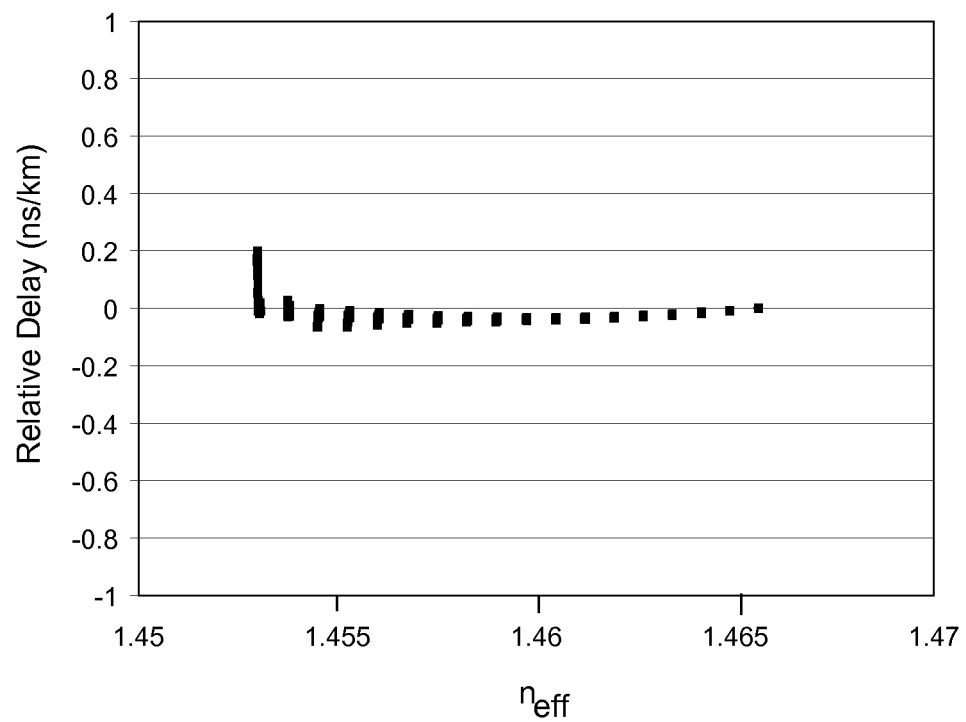
Figure 5D:
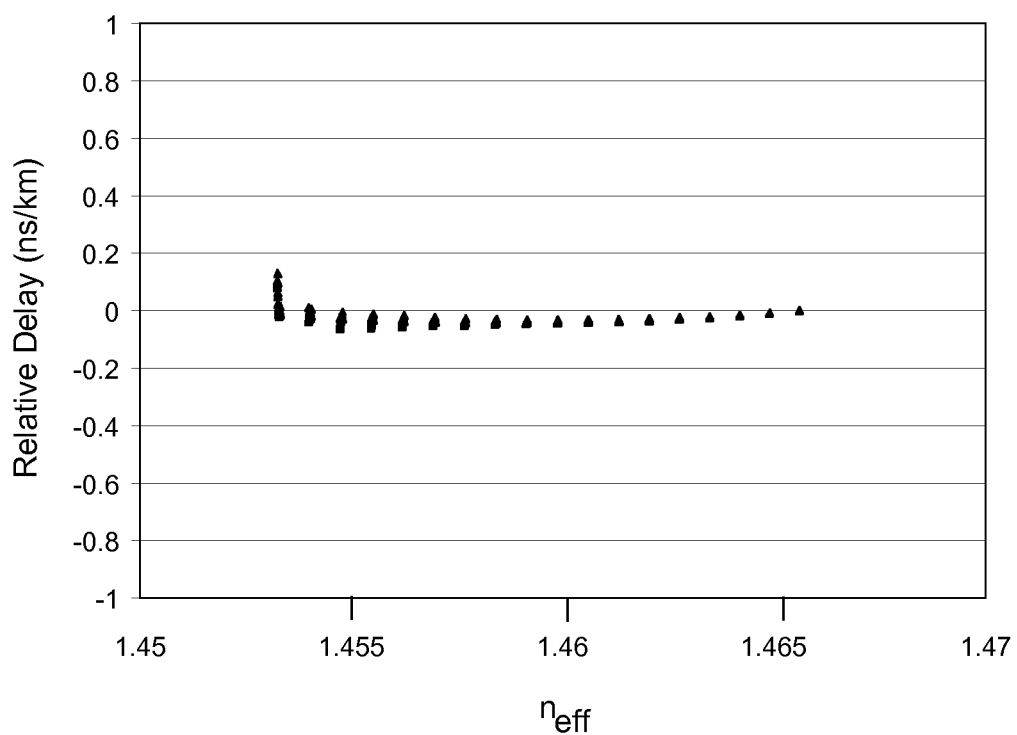
Figure 5E:
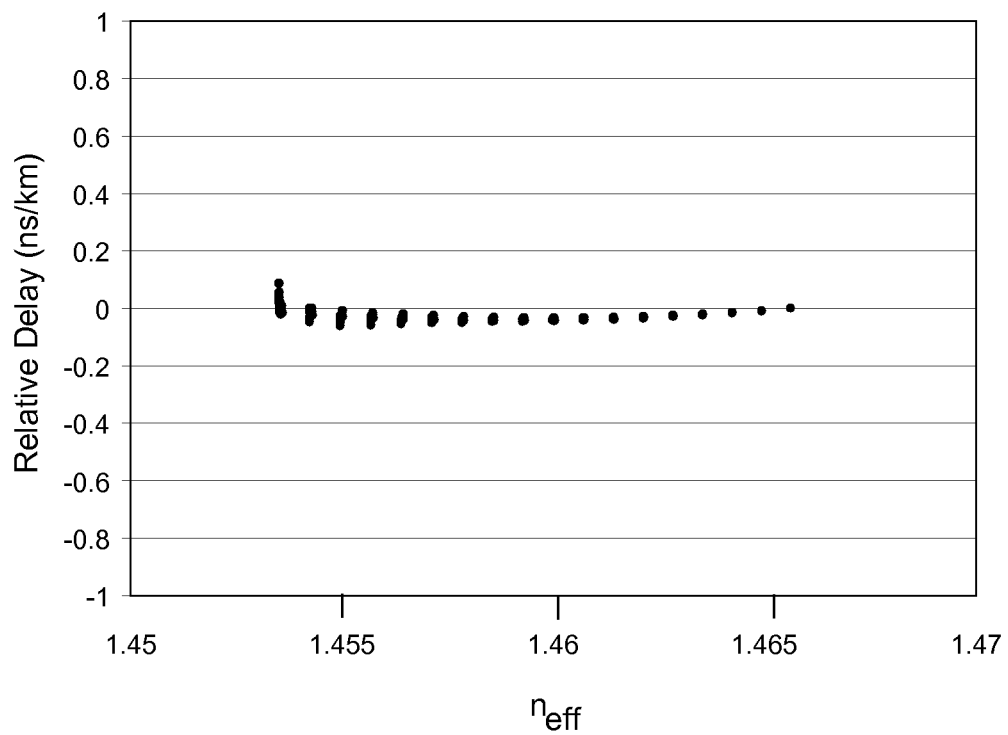
Figure 5F:
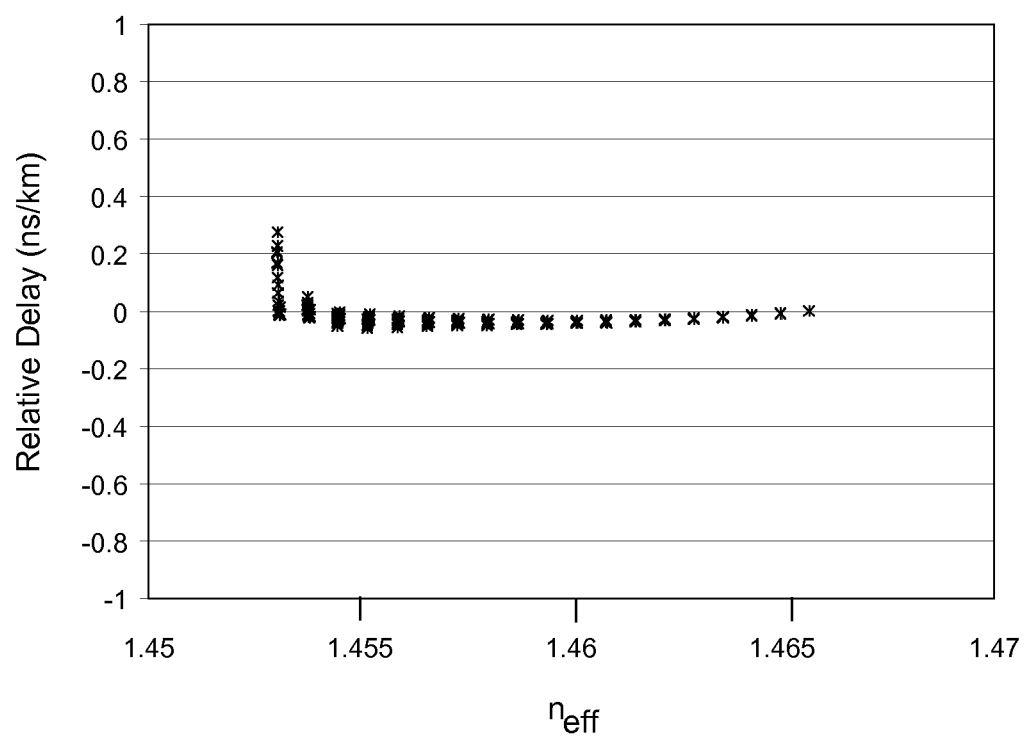

During design and manufacture of the exemplary multimode optical fiber of FIG. 4, an optimal (target) optical fiber core shape parameter $\alpha_{fcr}$ and an optimal offset value $W_1$ can be selected that minimizes the (calculated) relative time delays of the outer mode groups. However, even for an optimal shape parameter and an optimal offset, the time delays of the outermost guided mode groups (mode group guidable by a modeled multimode optical fiber) can still be higher than the inner mode groups. This can be seen in FIGS. 5A-5F where the measured relative time delays for six optical fibers are plotted as a function of effective refractive index ($\beta/k_0$, where $\beta$ is the propagation constant and $k_0=2\pi/\lambda$) at a wavelength of 850 nm for six core radii: 24.0 µm, 24.5 µm, 25.0 µm, 25.5 µm, 26.0 µm and 26.5 µm. That is, FIG. 5A depicts the time delays associated with the guided mode groups of a multimode optical fiber having a core radius of 24.0 µm, FIG. 5B depicts the relative time delays associated with the guided mode groups of a multimode optical fiber having a core radius of 24.5 µm, FIG. 5C depicts the relative time delays associated with the guided mode groups of a multimode optical fiber having a core radius of 25.0 µm and so on through a core radius of 26.5 µm. In FIGS. 5A-5F, the optical fiber core delta $\Delta_{fcr}$ was about 0.936%, the optical fiber core shape parameter $\alpha_{fcr}$ was 2.07, and the offset $W_1$ represented by region 52 was 1.4 um. FIGS. 5A-5F show that the relative time delay of the outermost guided mode group depends on the optical fiber core radius. For example, for an optical fiber core radius a=24 µm (FIG. 5A), the core has 17 mode groups. The relative time delay of the outermost guided modes is about 0.1 ns/km. As used herein, the relative time delay $\Delta\tau$ is calculated as $\Delta\tau$=(group delay of the observed higher order mode–group delay of the fundamental mode).

As the core radius a is increased to 24.5 µm (FIG. 5B), a new mode group appears for a total of 18 guided mode groups, and the maximum relative time delay of the outermost guided mode group is more than doubled, to a value of about 0.23 ns/km. When the core radius is further increased to 25 µm (FIG. 5C), the maximum relative time delay of the outermost mode group begins to decrease, but is still approximately double what it was for a core radius of 24.0 µm. As the core radius is increased from 25 µm to 26 µm (FIG. 5E) the maximum relative time delay is again reduced to less than 0.1 ns/km. When the core radius is increased to 26.5 µm (FIG. 5F), another new mode group appears and the maximum relative time delay is higher again. It is clear from the foregoing that the core radius affects the time delay of the outermost mode group. Preferably, the maximum relative time delay of the outermost guided mode group at the propagating wavelength is equal to or less than about 0.14 ns/km, equal to or less than about 0.1 ns/km, equal to or less than about 0.09 ns/km, equal to or less than about or equal to or less than about 0.085 ns/km.

Figure 6:
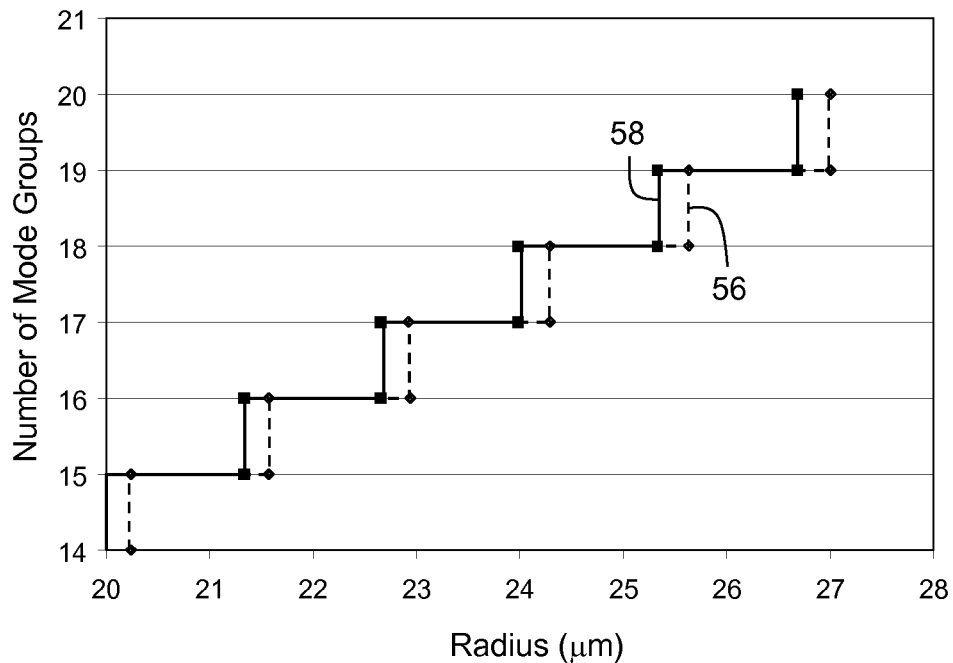
FIG. 6 is a plot illustrating the number of mode groups propagating as a function of core radius for several optical fibers having different core delta.

The threshold core radius $a_{th}$ to create a new mode group in a multimode optical fiber with a parabolic profile depends on the optical fiber core delta ($\Delta_{fcr}$) and mode group number P:

$$a_{th} = \frac{2\left(P-\frac{1}{3}\right)}{n_{cr}\sqrt{2\Delta_{fcr}}} \frac{\lambda}{2\pi} \tag{7}$$

where $n_{cr}$ is the maximum core refractive index at wavelength $\lambda$ (e.g., 850 nm). For $\alpha$ of about 2, $a_{th}$ is determined by equation (7). FIG. 6 plots the number of guided mode groups as a function of optical fiber core radius for two values of $\Delta_{fcr}$ and shows the threshold core radius $a_{th}$ depends also on the core delta $\Delta_{fcr}$. Line 56 passing through the diamond data points represents $\Delta_{fcr}$=0.923% while line 58 passing through the filled square data points represents $\Delta_{fcr}$=0.945%. Both lines 56 and 58 resemble stair steps, with line 56 shifted to the right of line 58 in the figure. Subsequently, a target core radius $a_t$ can be selected such that the delay of the outermost guided mode group (mode group guidable by a modeled multimode optical fiber) is minimized before the next guided mode group (mode group guidable by a modeled multimode optical fiber) appears. This implies choosing a target core radius $a_t$ just below the threshold radius $a_{th}$ for a new mode group. The distance in threshold radius $\Delta a_{th}$ between two adjacent mode groups is $$\delta a_{th} = \frac{2}{n_{cr}\sqrt{2\Delta_{fcr}}} \frac{\lambda}{2\pi}. \tag{8}$$

Preferably, the target optical fiber core radius $a_t$ is in the range of $(a_{th}-0.5\delta a_{th}) \leq a_t \leq a_{th}$. More preferably the target optical fiber core radius $a_t$ is in the range of $(a_{th}-0.2\delta a_{th}) \leq a_t \leq a_{th}$. Even more preferably, $(a_{th}-0.1\delta a_{th}) \leq a_t \leq a_{th}$.

In accordance with the foregoing, a method of making a multimode optical fiber is described below wherein the refractive index profile of a core preform can be obtained. Preferably, a shape parameter $\alpha_{pcr}$ of the core preform refractive index profile has a value between 1.8 and 2.3, preferably between 1.9 and 2.2. The core preform may be, for example, a core cane as described supra, and may include cladding material. After the refractive index profile of the core preform has been measured, the guided mode groups and their respective time delays are calculated by varying the core radius within the calculation and calculating the threshold radii for the guided mode groups. A target core radius $a_t$ is selected just below a threshold radius such that the delay of the outermost guided mode group is minimized. Once an optimal target core radius as been selected, a cladding layer is formed on the core preform to form an optical fiber preform and an optical fiber is drawn therefrom. Forming a cladding layer may comprise, for example, depositing a first cladding material on the core preform to form a first inner cladding layer around the core preform, wherein the first inner cladding layer has an outer radius $R_1$, a width $W_1$ as previously described greater than 0.5 µm and a relative refractive index difference $\Delta_1$ between −0.1% and 0.1%, and depositing a second cladding material over the first cladding material to form a second inner cladding layer, wherein the second inner cladding has an outer radius $R_2$, a width $W_2$ greater than 1.0 µm and a relative refractive index difference $\Delta_2$ less than −0.2%. The low index second cladding layer forms a "moat" that improves the guidance of modes in the fiber, thereby improving the bend loss of the fiber. In some embodiments, a third cladding material may be deposited over the first and second cladding materials to form an outer cladding layer that, inter alia, serves as the reference refractive index value for determining relative refractive indices. During the drawing process the optical fiber core radius is targeted to the selected optimal core radius. The outer cladding material may be, for example, silica.

Figure 7:
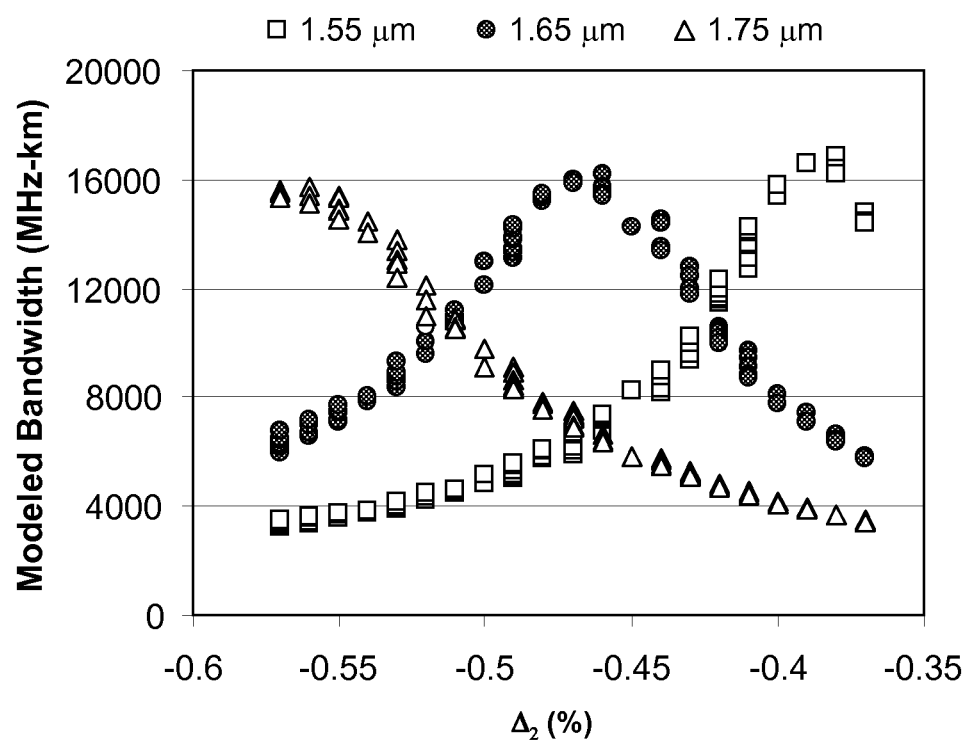
FIG. 7 is a plot illustrating an example relationship between bandwidth and moat delta for three different values of the width $W_1$ of the first inner cladding.
Figure 8:
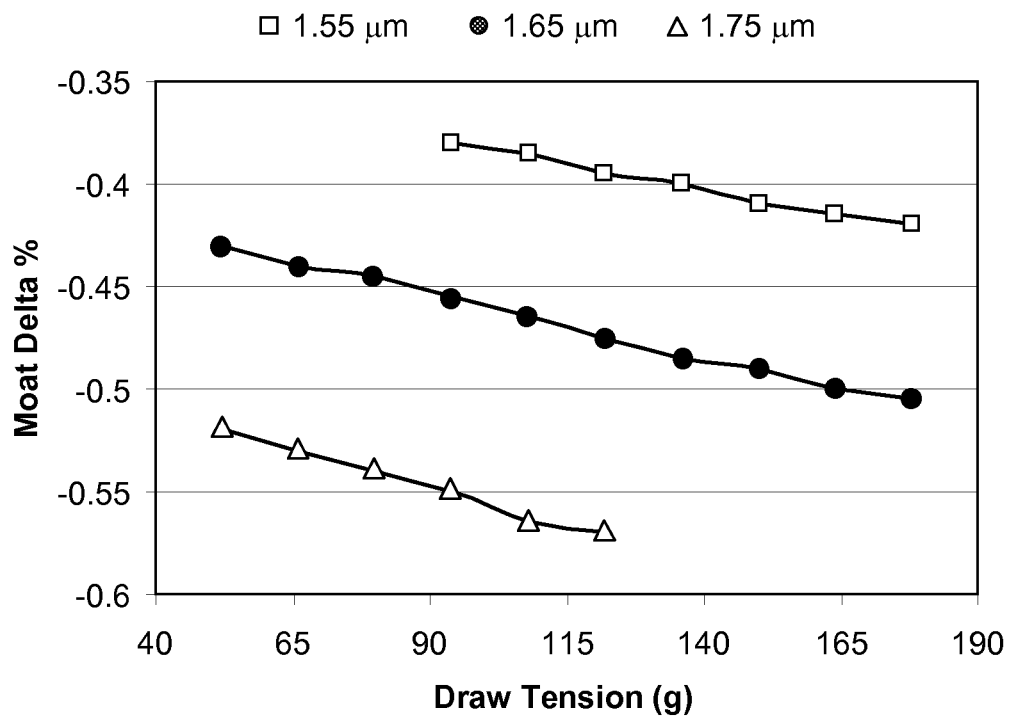
FIG. 8 is a plot illustrating an example relationship between moat delta and draw tension for three different values of the width $W_1$ of the first inner cladding.

FIG. 7 illustrates the dependence of a modeled overfilled bandwidth at 850 nm on $\Delta_2$ for different values of inner cladding width $W_1$, where the square data correspond to $W_1$=1.55 µm, the filled circle correspond to $W_1$=1.65 µm and the triangle data correspond to $W_1$=1.75 µm. For each value of $W_1$, there is a value of $\Delta_2$ that maximizes the bandwidth by ensuring the maximum relative time delays of the outer guided mode groups are less than 0.1 ns/km. If $\Delta_2$ is more negative than this optimum value, the relative time delays of the outer modes increase, and the bandwidth decreases. If $\Delta_2$ is less negative than this optimum value, the relative time delays of the outer modes decrease, and the bandwidth also decreases. The optimum value of $\Delta_2$ is also a function of the draw tension, as illustrated in FIG. 8. FIG. 8 illustrates a modeled moat delta $\Delta_2$ in percent as a function of draw tension in grams for different values of $W_1$, where, as in FIG. 7, the square data correspond to $W_1$=1.55 µm, the filled circle data correspond to $W_1$=1.65 µm and the triangle data correspond to $W_1$=1.75 µm. A low draw tension increases the index of the outer cladding, which decreases the relative refractive index difference of the second inner cladding layer (i.e. makes it more negative). This tension-induced refractive index change can be compensated by targeting a less negative value of $\Delta_2$ when the second cladding layer is formed.

The tension on the optical fiber during the drawing process can have a significant impact on the relative refractive index profile of a drawn optical fiber, and in particular on the optical fiber core relative refractive index difference, because the refractive index of the cladding material varies with tension. And, because the number of guided mode groups is determined by both the core radius and the core relative refractive index difference, tension data is needed. Thus, in other embodiments the effects of draw tension on both core radius and the optical fiber core shape parameter and core relative refractive index difference as the optical fiber is drawn may be accounted for.

Figure 9:
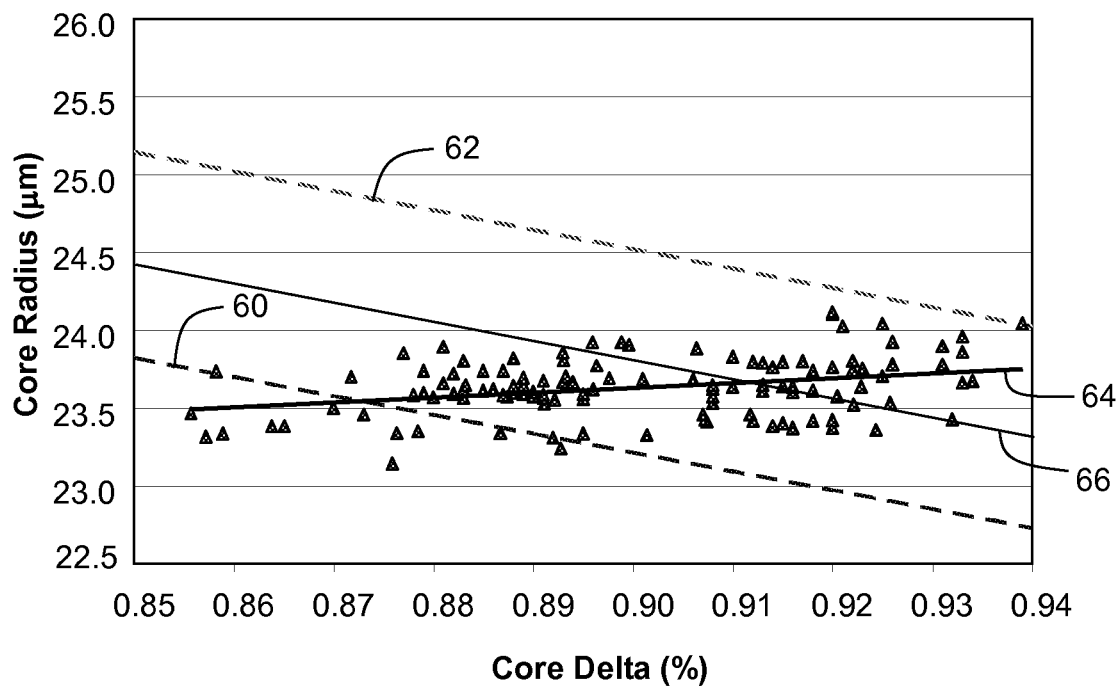
FIG. 9 is a plot depicting core radius vs. core delta for a population of bend insensitive optical fibers, and shows the cutoff boundaries between the $16^{th}$, $17^{th}$ and $18^{th}$ mode groups.

FIG. 9 depicts a plot of measured geometric core radii vs. the core relative refractive index difference ($\Delta_{fcr}$) for a population of bend insensitive multimode optical fibers with relative refractive index profiles such as the relative refractive index profile illustrated in FIG. 4 and having a nominal optical core diameter of 50 µm. Also shown are lines 60 and 62 indicating boundaries between the supported propagation of 16 and 17 mode groups (line 60) and 17 and 18 mode groups (line 62). That is, the boundary lines represent the theoretical cutoff wavelength for all of the modes in a given mode group. For example, Line 60 indicates where the theoretical cutoff wavelengths of all modes in the $17^{th}$ mode group are <850 nm.

As is typical in a commercial environment, the geometric core radii are nearly uniformly distributed about a nominal, in this case a nominal of about 23.7 µm. It should be noted that because the optical fibers represented by the data of FIG. 9 include a depressed annular region (.e. region 54) the optical core diameter (nominally 50 µm) includes the offset region 52. However, the data of FIG. 9 reflect only the core region 52, and therefore the average core radius is less than the expected nominal of 25 µm. Line 64 represents a linear fit to the data.

The data of FIG. 9 illustrate the effect of targeting a nominal core radius regardless of the core delta that may be observed as a result of individual fiber variation. That is, as previously described, not only does core delta vary as a function of normal manufacturing variation, but core delta is also a function of draw tension, since the cladding refractive index changes with tension. Thus, optical fibers represented by the data below line 60 in FIG. 9 propagate only 16 mode groups. Optical fibers represented by the data above line 60 in FIG. 9 propagate 17 or more mode groups. Optical fibers represented by the data above line 62 in FIG. 9 propagate 18 or more mode groups.

The inventors herein, however, have found that decreased relative time delay, and therefore increased bandwidth, can be obtained when an optical fiber is designed with a core radius that creates conditions where the theoretical cutoff wavelength of the next higher mode group number is approached. Referring to FIG. 9 again, this means a preferred operating region would have the data distributed between the $16^{th}$ and $17^{th}$ mode groups, without going over the $18^{th}$ mode group cutoff wavelength (line 62), and preferably without falling below the $17^{th}$ mode group cutoff wavelength line. This can be better illustrated with the aid of FIGS. 10A-10D. FIGS. 10A-10D depict relative time delays for a multimode optical fiber having a relative refractive index profile such as that illustrated in FIG. 4. The optical fiber has a constant core delta, but increasing core radius as one moves from FIG. 10A to FIG. 10D.

Figure 10A:
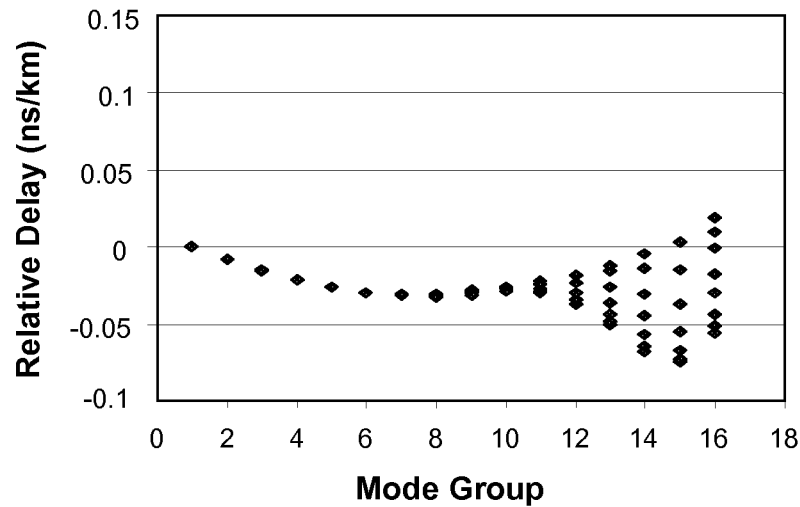
FIGS. 10A-10D are plots showing relative time delay as a function of mode group for optical fibers of increasing core radius, and illustrates the varying relative time delay as the number of mode groups changes.
Figure 10B:
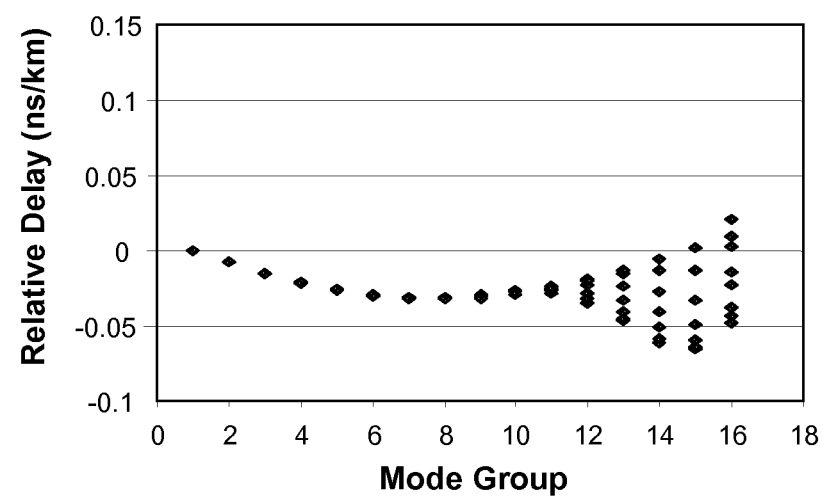
Figure 10C:
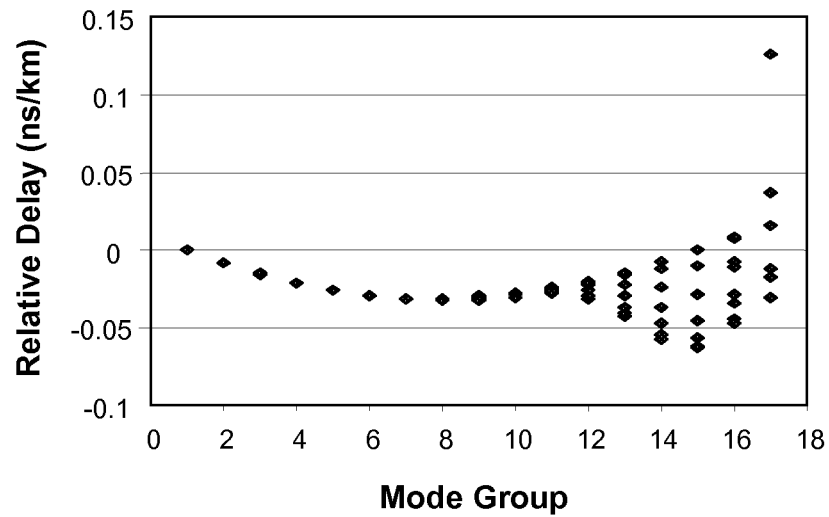
Figure 10D:
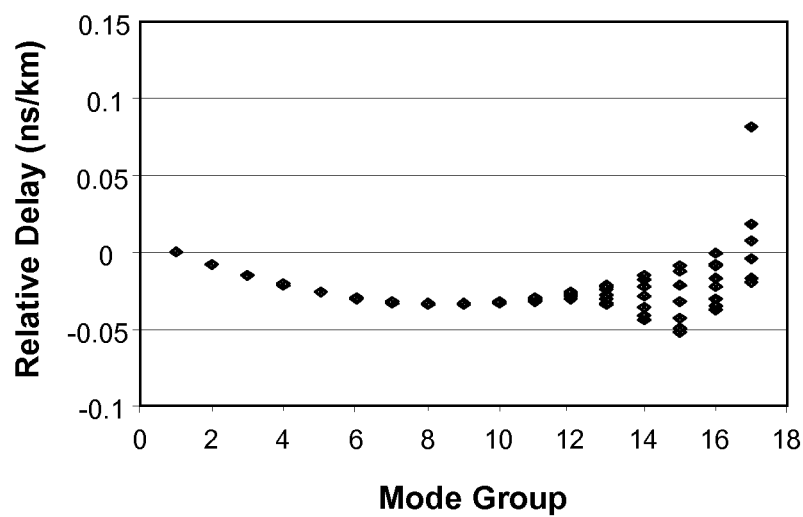

In FIG. 10A, the data indicate the propagation of 16 guided modes groups and the fiber is operating below the $17^{th}$ mode group cutoff wavelength. The maximum relative time delay $\Delta\tau$ is 0.085 ns/km. FIG. 10B depicts the time delay for an optical fiber operating at the $17^{th}$ mode group cutoff wavelength. Only 16 mode groups are still guided. Here, the maximum relative time delay $\Delta\tau$ is 0.085 ns/km. Turning to FIG. 10C, the optical fiber is operating just above the $17^{th}$ mode group cutoff wavelength, but below the $18^{th}$ mode group cutoff wavelength. This is sufficient to guide 17 mode groups within the optical fiber. However, the $17^{th}$ guided mode group is leaky (not strongly guided and easily attenuated out of the optical fiber after only several tens of meters under normal deployment conditions, e.g. cabled or under other bending conditions). As a result, the $17^{th}$ guided mode group can be largely ignored for all practical purposes, and the maximum relative time delay $\Delta\tau$=0.080 ns/km. Finally, FIG. 10D illustrates the situation where the optical fiber is operating approximately midway between the $16^{th}$ and $17^{th}$ mode group cutoff wavelengths, e.g. where the theoretical cutoff wavelength of the $17^{th}$ mode group is between about 870 nm and 880 nm. Again, it is assumed the effective cutoff wavelength of the $17^{th}$ mode group is less than 850 nm and therefore easily attenuated, and the maximum relative time delay is about 0.058 ns/km based on only 16 guided mode groups.

The above analysis indicates that as the core radius and/or relative refractive index (delta) increases, the effective refractive indices of the $16^{th}$ and lower guided mode groups increase further above the cladding refractive index. The theoretical cutoff wavelengths of the modes in the $17^{th}$ guided mode group increase, but they can be ignored as the effective cutoff wavelengths of these modes is <850 nm. The larger core radius reduces the modal time delays of the inner 16 guided mode groups. This reduction in time delays can help alleviate design and/or manufacturing sensitivities, such as any sensitivity to offset width ($W_1$).

Returning to FIG. 9, a preferred optical fiber design results in a core radius vs. core delta that has a trajectory generally parallel with the theoretical cutoff wavelength lines 60 or 62. That is, the fiber is designed such that the core radius vs. core delta trends along line 66 in FIG. 8.

The variability of the shape parameter $\alpha_{fcr}$ of a multimode optical fiber as a function of the draw tension can be determined by drawing an optical fiber from an optical fiber preform formed with a core preform having a known core shape parameter $\alpha_{pcr}$. The core preform may be, for example, a core rod or core cane. The core cane comprises core material, and in some embodiments, may include at least a portion of a cladding material. Prior to depositing a cladding material on a core preform, the core preform refractive index profile is measured to determine the shape parameter $\alpha_{pcr}$ of the core preform refractive index profile and the index difference $\Delta_{pcr}$ of the core preform relative to pure silica.

Figure 11:
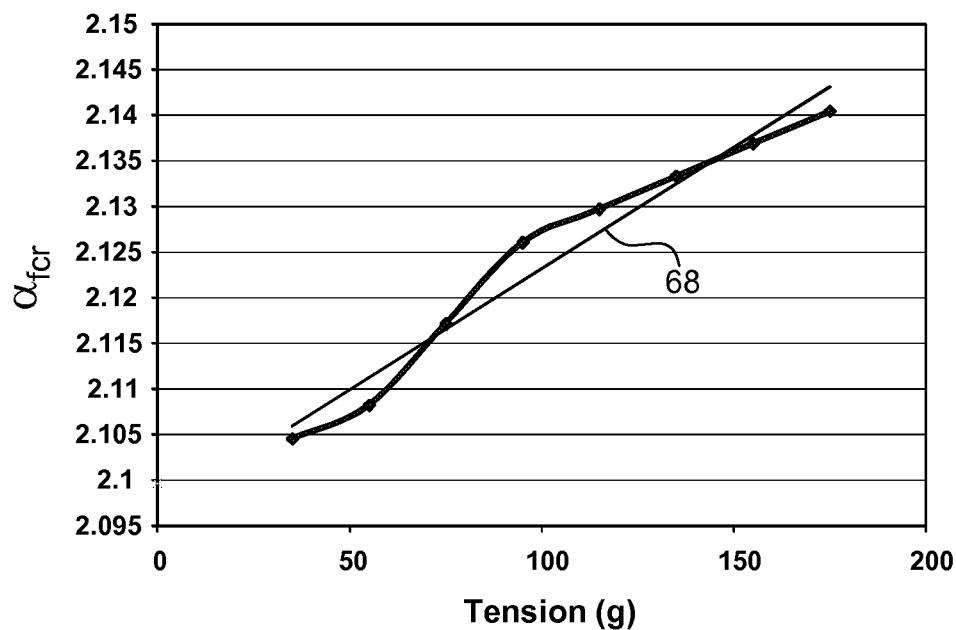
FIG. 11 is a plot illustrating an example relationship between draw tension and shape parameter.

Once cladding material has been deposited on the core preform, and consolidated if necessary (in the case the core material is deposited as glass soot), an optical fiber is drawn from the resulting optical fiber preform at varying tensions. The drawn optical fiber is then measured at locations reflecting the different draw tensions to find the shape parameter $\alpha_{fcr}$ of the optical fiber core and the relative refractive index difference $\Delta_{fcr}$ between the maximum refractive index of the optical fiber core and the refractive index of the cladding (preferably at a location near the outer periphery of the cladding). By measuring the refractive index of the cladding material near a periphery of the optical fiber, the effects of an interior feature, such as the existence of a depressed refractive index region, can be avoided. Draw tension T versus optical fiber shape data can then be evaluated, such as by plotting, to characterize the relationship between $\alpha_{fcr}$ and draw tension. For example, as shown in FIG. 11, $\alpha_{fcr}$ as a function of draw tension is shown based on a core preform $\alpha_{pcr}$ value of 2.1 for a multimode optical fiber drawn to a nominal core diameter of 50 μm and an overall cladding diameter of 125 μm. A straight line fit was made to the data having slope S. The relationship between draw tension and the shape parameter of a drawn optical fiber has been found to follow closely the following exemplary expression:

$$T=((\alpha_{fcr}-\alpha_{pcr})/S)-T_0 \quad (9)$$

Equation 9 can be seen to be the linear fit (line 68) to the data of FIG. 9, where T is the desired optical fiber draw tension to obtain the desired shape parameter in the optical fiber, $\alpha_{fcr}$ and S is the slope of the line. $T_0$ is the nominal or initial draw tension that would have been used but for the effect of tension on the shape parameter, thus ($T-T_0$) becomes the change in tension $\Delta T$ that must be made to the initial draw tension to obtain the desired core shape parameter in the optical fiber based on the shape parameter for the core preform. Determination of the relationship between draw tension and $\alpha_{fcr}$ need only be conducted once for a particular fiber design and drawing process.

Using equation (9), a draw tension can be selected that obtains (produces) a predetermined (target) optical fiber core shape parameter $\alpha_{fcr}$ from an optical fiber core preform having a given core preform shape parameter $\alpha_{pcr}$.

Figure 12:
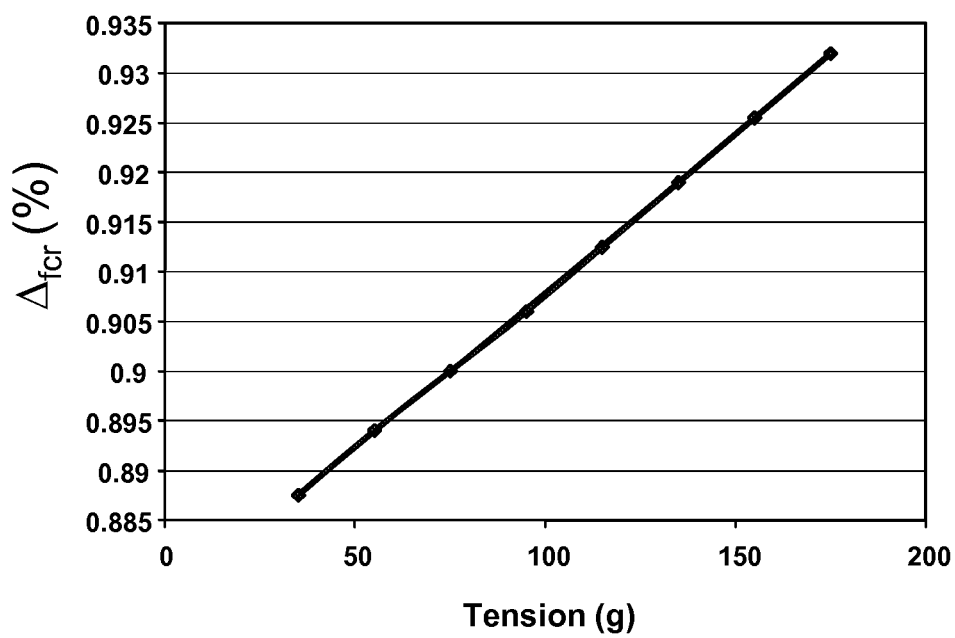
FIG. 12 is a plot illustrating an example relationship between draw tension and core delta.

Draw tension also plays a meaningful role in determining the final relative refractive index difference of an optical fiber. That is, stress optic effects resulting from the draw tension cause the cladding refractive index of the optical fiber to vary from the cladding zero tension refractive index, thereby altering core delta from what one would calculate based on the non-zero tension refractive indices of the core and the cladding materials. Accordingly, a second experiment can be conducted by drawing an optical fiber at a plurality of different draw tensions from an optical fiber preform produced using a core preform with a known refractive index profile, and in particular a known core relative refractive index difference $\Delta_{pcr}$. As before, the core preform may comprise a core rod or core cane as previously described. The resultant $\Delta_{fcr}$ can then be described as a function of draw tension. An exemplary relationship between the draw tension and relative refractive index difference of the optical fiber is depicted in FIG. 12 and expressed in the following equation $$\Delta_{fcr}=\Delta_{pcr}+B(T-T_0), \quad (10)$$

where T is again the desired optical fiber draw tension from equation 9, $T_o$ is the initial draw tension, B is the slope of the linear fit to the data and $\Delta_{pcr}$ is the maximum relative refractive index difference of the core preform.

Once the tension-adjusted fiber core delta $\Delta_{fcr}$ is determined, the threshold radius $a_{th}$ can be determined using equation 7. As with the relationship between the optical fiber shape parameter $\alpha_{fcr}$ and tension, the relationship for $\Delta_{fcr}$ need be determined only once for a particular optical fiber design and manufacturing process.

A method of optimizing the bandwidth of a multimode optical fiber in the preceding manner can be better understood using the steps described below.

At a first step, an optical fiber core preform is provided. The optical fiber preform may be a preform obtained by any of the foregoing techniques, or any other method suitable for obtaining an optical fiber core preform. For example, the optical fiber core preform may be a core cane produced as described above. The optical fiber core preform comprises a shape having a shape parameter. However, the shape parameter need not comprises an alpha (α) profile.

A refractive index profile n(r) of the core preform is determined by measuring the core preform. The refractive index profile n(r) describes the refractive index of the preform as a function of radial distance r from a centerline of the preform. Instruments for determining the refractive index profile are readily commercially available.

Next, a core delta $\Delta_{fit}$, core radius $a_{fit}$ and core shape parameter $\alpha_{fit}$ are varied such that the difference between n(r) and a fitting function f(r) defined as $f(r)=n(0)[1-2\Delta_{fit}(r/a_{fit})^{\alpha fit}]^{1/2}$ is minimized. When f(r) has been fit to n(r), a target preform $\alpha_{pcr}$ is obtained, the target $\alpha_{pcr}$ being the $\alpha_{fit}$ obtained from the best fit of f(r) to n(r). In certain instances the effective maximum (e.g. n(0)) and minimum refractive indices of the core may be difficult to obtain. For example, a centerline depression or other anomalous structure may make determination of the core boundaries and refractive index peak difficult to obtain. In such instances, f(r) may be evaluated between the limits of r=0.15a to r=0.95a.

Next, a draw tension T is selected that obtains $\alpha_{fcr}$ from $\alpha_{pcr}$. For example, as previously described, the shape parameter $\alpha_{fcr}$ is a function of tension. In this step, the draw tension T that will be used to draw an optical fiber from an optical fiber preform made with the core preform above having $\alpha_{pcr}$ is determined by selecting the tension that results in a shape parameter value that most closely approaches $\alpha_{fcr}$.

Knowing that the cladding refractive index also varies as a function of draw tension, a cladding refractive index $n_{cl}$ obtained when a cladding material having a zero tension refractive index is drawn at tension T is calculated (e.g., calculated when the draw tension T is applied to the cladding material). For example, selected cladding material, for example pure silica, has a known zero-tension refractive index. However, the refractive index of the cladding material after drawing may nonetheless be different than the refractive index of the cladding material prior to drawing. This change should be accounted for.

Next, an optical fiber core preform relative refractive index profile $\Delta_{fcr}(r)$ is calculated, where $$\Delta_{fcr}(r) = \frac{n^2(r) - n_{cl}^2}{2n^2(0)}. \quad (11)$$

A target core radius $a_t$ is then selected, and a thickness of a cladding material to be added to the core preform is determined. The cladding thickness is determined such that after the cladding material is added to the preform (and sintered if necessary), and the preform is drawn into an optical fiber having a predetermined outside (cladding) diameter, the core diameter of the drawn optical fiber is $a_t$. Typically, the outside cladding diameter is nominally 125 µm, e.g. from about 120 µm to about 130 µm.

Once the process parameters of the optical fiber have been obtained, cladding material may then be formed on the core preform to form an optical fiber preform, and an optical fiber preform is drawn to the target core radius $a_t$ using the selected draw tension T and a predetermined maximum cladding diameter. For example, a maximum diameter of the fiber cladding after drawing may be in a range from about 120 µm to about 130 µm, from about 122 µm to about 130 µm or from about 124 µm to about 126 µm. A typical nominal optical fiber cladding diameter is 125 µm.

In another embodiment, a method of making a multimode optical fiber may involve the following steps.

In a first step of the method an optical fiber core preform is provided by any suitable method. The core preform may, in some instances, be a core cane as described above. The core cane comprises core material, and in some embodiments, may include at least a portion of a cladding material.

In a next step, a refractive index profile n(r) of the core preform is determined.

Next, a core delta $\Delta_{fit}$, core radius $a_{fit}$ and core shape parameter $\alpha_{fit}$ are varied such that the difference between n(r) and a fitting function f(r) defined as $f(r)=n(0)[1-2\Delta_{fit}(r/a_{fit})^{\alpha_{fit}}]^{1/2}$ is minimized. When f(r) has been fit to n(r), a target preform $\alpha_{pcr}$ is obtained, the target $\alpha_{pcr}$ being the $\alpha_{fit}$ obtained from the best fit of f(r) to n(r). In certain instances the effective maximum (e.g. n(0)) and minimum refractive indices of the core may be difficult to obtain. For example, a centerline depression or other anomalous structure may make determination of the core boundaries and peak difficult to obtain. In such instances, f(r) may be evaluated between the limits of r=0.15a to r=0.95a.

In a next step a draw tension T is selected that obtains $\alpha_{fcr}$ from $\alpha_{pcr}$. For example, as previously described, the shape parameter $\alpha_{fcr}$ is a function of tension. In this step, the draw tension T that will be used to draw an optical fiber from an optical fiber preform made with the core preform above having $\alpha_{pcr}$ is determined by selecting the tension that results in a shape parameter value that most closely approaches $\alpha_{fcr}$.

Knowing that the cladding refractive index also varies as a function of draw tension, a cladding refractive index $n_{cl}$ obtained when a cladding material having a zero tension refractive index is drawn at tension T is next calculated (e.g., calculated when the draw tension T is applied to the cladding material). Then, a relative refractive index profile of a (modeled) multimode optical fiber comprising optical fiber core shape parameter $\alpha_{fcr}$ relative to $n_{cl}$ is calculated In yet another step, an optical fiber relative refractive index profile $\Delta_{fcr}(r)$ is calculated, where $$\Delta_{fcr}(r) = \frac{n^2(r) - n_{cl}^2}{2n^2(0)}. \quad (12)$$

In another step a first inner cladding is formed on the core preform, wherein the first inner cladding has a width $W_i$ greater than 0.5 micron and a relative refractive index difference $\Delta_1$ between −0.1% and 0.1%, and wherein $W_1$ and $\Delta_1$ are selected to maximize the bandwidth of an optical fiber having the relative refractive index profile $\Delta(r)$ calculated above at a predetermined (first) wavelength. The predetermined (first) wavelength can be any wavelength, depending on the optical fiber and its application. However, the predetermined (first) wavelength is typically 850 nm.

In still another step a second inner cladding is formed on the core preform, wherein the second inner cladding has a width $W_2$ greater than 1.0 micron and a relative refractive index difference $\Delta_2$ less than −0.2%, and wherein $W_2$ and $\Delta_2$ are selected to maximize the bandwidth of the optical fiber having the relative refractive index profile $\Delta(r)$ calculated above at a predetermined (first) wavelength.

Next, an outer cladding material is formed on the core preform to form an optical fiber preform, and the optical fiber preform is drawn to the target core radius $a_t$ using the selected draw tension T and a predetermined maximum cladding diameter. For example, a maximum diameter of the cladding may be between 120 µm and 130 µm. The outer cladding material may be, for example, silica.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making a multimode optical fiber comprising
   measuring a refractive index profile n(r) of an optical fiber core preform at a first wavelength λ;
   selecting a core delta $\Delta_{fit}$, core radius $a_{fit}$ and core shape parameter $\alpha_{fit}$ that minimize a refractive index difference between n(r) and $f(r)=n(0)[1-2\Delta_{fit}(r/a_{fit})^{\alpha_{fit}}]^{1/2}$ as a function of radius r;
   selecting a target optical fiber core shape parameter $\alpha_{fcr}$ different than $\alpha_{fit}$;
   selecting a draw tension T that produces the target optical fiber core shape parameter $\alpha_{fcr}$ from $\alpha_{fit}$;

calculating a refractive index $n_{cl}$ at $\lambda$ of a cladding material when the draw tension T is applied to the cladding material;
calculating a relative refractive index profile of a modeled multimode optical fiber comprising optical fiber core shape parameter $\alpha_{fcr}$ relative to $n_{cl}$;
calculating a target optical fiber core radius $a_t$ such that a calculated relative time delay at $\lambda$ of an outermost mode group guidable by the modeled multimode optical fiber is minimized;
depositing the cladding material on the optical fiber core preform to form an optical fiber preform; and
drawing a multimode optical fiber from the optical fiber preform at the tension T such that the multimode optical fiber comprises an outside diameter of 125±2 μm, a core radius equal to $a_t$ and a core shape parameter between 1.8 and 2.3.

2. The method according to claim 1, wherein no more than 18 mode groups that can be guided by the modeled multimode optical fiber at the wavelength $\lambda$ have cutoff wavelengths greater than 850 nm.

3. The method according to claim 1, wherein the depositing cladding material comprises depositing a first cladding material on the core preform and depositing a second cladding material different from the first cladding material and comprising at least 0.5 wt. % fluorine on the first cladding material.

4. The method according to claim 1, wherein the depositing cladding material comprises depositing a first cladding material having a first refractive index $n_1$ over the core preform, depositing a second cladding material having a refractive index $n_2$ less than $n_1$ on the first cladding material and depositing an outer cladding material over the second cladding material, and wherein the multimode optical fiber comprises a first cladding layer having a thickness $W_1$ and a second cladding layer different from the first cladding layer having a thickness $W_2$, wherein $W_1$ is greater than about 0.5 μm, and $W_2$ is greater than 1.0 μm and a refractive index of the outer cladding layer is $n_{cl}$.

5. The method according to claim 1, wherein the multimode optical fiber comprises a first inner cladding layer, a second inner cladding layer over the first cladding layer and an outer cladding layer over the second cladding layer, and a relative refractive index difference $\Delta_1$ of the first cladding layer relative to the outer cladding layer is in a range from about −0.1% to about 0.1% and a relative refractive index difference $\Delta_2$ of the second cladding material relative to the outer cladding layer is equal to or less than −0.2%.

6. The method according to claim 1, wherein the multimode optical fiber comprises a first inner cladding layer having a width $W_1$ greater than 0.5 μm and a relative refractive index difference $\Delta_1$ relative to an outer cladding layer between −0.1% and 0.1%, and a second inner cladding layer over the first inner cladding layer, wherein the second inner cladding layer has a width $W_2$ greater than 1.0 μm and a relative refractive index difference $\Delta_2$ relative to an outer cladding layer less than −0.2%.

7. The method according to claim 1, wherein a maximum relative refractive index difference of the multimode optical fiber core relative to an outer cladding layer is equal to or less than 1.05% and a radius of the multimode optical fiber core is equal to or greater than 23.0 μm.

8. A method of manufacturing a multimode optical fiber comprising:

measuring a refractive index profile of a core preform at a first wavelength $\lambda$ to obtain a shape parameter $\alpha_{pcr}$ and a maximum relative refractive index difference $\Delta_{pcr}$ of the core preform;
determining a target draw tension that produces the target optical fiber shape parameter $\alpha_{fcr}$ from $\alpha_{pcr}$;
calculating an optical fiber core relative refractive index difference $\Delta_{fcr}$ at $\lambda$ obtained from $\Delta_{pcr}$ with the target draw tension;
using $\Delta_{fcr}$ to calculate a target core radius $a_t$ of a modeled multimode optical fiber that minimizes a relative time delay $\Delta\tau$ of an outermost mode group guidable by the modeled multimode optical fiber at $\lambda$;
forming an outer cladding over the core preform to form an optical fiber preform; and
drawing a multimode optical fiber comprising a core and a cladding from the optical fiber preform at the target draw tension such that the multimode optical fiber comprises an outside diameter of 125±2 μm, a core radius equal to $a_t$ and a maximum relative refractive index difference of the multimode optical fiber core relative to the cladding is equal to or less than 1.05% and $a_t$ is equal to or greater than 23.0 μm.

9. The method according to claim 8, wherein no more than 18 modes groups that can be guided by the modeled multimode optical fiber have cutoff wavelengths greater than 850 nm.

10. The method according to claim 8, wherein $\Delta\tau \leq 0.14$ ns/km.

11. A method of making a multimode optical fiber comprising:
measuring a refractive index profile n(r) of an optical fiber core preform at a wavelength $\lambda$ of 850 nm;
selecting a core delta $\Delta_{fit}$, core radius $a_{fit}$ and core shape parameter $\alpha_{fit}$ that minimize a refractive index difference between n(r) and $f(r) = n(0)[1-2\Delta_{fit}(r/a_{fit})^{\alpha_{fit}}]^{1/2}$ from $r=0.15a_{fit}$ to $r=0.95a_{fit}$;
selecting a draw tension T that produces a target optical fiber core shape parameter $\alpha_{fcr}$ from $\alpha_{fit}$;
calculating a refractive index $n_{cl}$ at $\lambda$ of a cladding material when the draw tension T is applied to the cladding material;
using $n_{cl}$ to calculate a relative refractive index profile $\Delta_{fcr}(r)$ of a modeled multimode optical fiber core having optical fiber core shape parameter $\alpha_{fcr}$, where $$\Delta_{fcr}(r) = \frac{n^2(r) - n_{cl}^2}{2n^2(0)};$$

calculating a target optical fiber core radius $a_t$ that minimizes a relative time delay $\Delta\tau$ of an outermost mode group guidable by the modeled multimode optical fiber at $\lambda$;
determining a thickness of the cladding material necessary to deposit on the optical fiber core preform to obtain $a_t$ in a multimode optical fiber drawn at the draw tension T with an outside cladding diameter 125±2 μm from an optical fiber preform comprising the optical fiber core preform;
depositing the cladding material to the determined thickness on the optical fiber core preform to form the optical fiber preform, the depositing cladding material comprising depositing a first cladding material and depositing a second cladding material different from the first cladding material and comprising at least 0.5 wt. % fluorine over the first cladding material; and drawing the multimode optical fiber from the optical fiber preform at the tension T such that the core diameter of the multimode optical fiber is $a_f$.

12. The method according to claim 11, wherein no more than 18 mode groups guidable by the modeled multimode optical fiber at 850 nm have cutoff wavelengths greater than 850 nm.

13. The method according to claim 11, wherein the multimode optical fiber comprises a first cladding layer having a thickness $W_1$ and a second cladding layer different from the first cladding layer having a thickness $W_2$, wherein $W_1$ is greater than about 0.5 μm, and $W_2$ is greater than 1.0 μm.

14. The method according to claim 13, wherein a relative refractive index difference $\Delta_1$ of the first cladding layer relative to an outer cladding layer is in a range from about −0.1% to about 0.1% and a relative refractive index difference $\Delta_2$ of the second cladding layer relative to the outer cladding layer is equal to or less than −0.2%.

* * * * *